United States Patent
Yadavali et al.

(10) Patent No.: US 12,194,460 B2
(45) Date of Patent: Jan. 14, 2025

(54) SILICON CHIP HAVING MULTI-ZONE THROUGH SILICON VIAS AND METHOD OF MANUFACTURING THE SAME

(71) Applicant: THE TRUSTEES OF THE UNIVERSITY OF PENNSYLVANIA, Philadelphia, PA (US)

(72) Inventors: Sagar Prasad Yadavali, Downingtown, PA (US); David Aaron Issadore, Philadelphia, PA (US); Daeyeon Lee, Wynnewood, PA (US)

(73) Assignee: The Trustees of the University of Pennsylvania, Philadelphia, PA (US)

(*) Notice: Subject to any disclaimer, the term of this patent is extended or adjusted under 35 U.S.C. 154(b) by 772 days.

(21) Appl. No.: 17/425,088

(22) PCT Filed: Jan. 29, 2020

(86) PCT No.: PCT/US2020/015684
§ 371 (c)(1),
(2) Date: Jul. 22, 2021

(87) PCT Pub. No.: WO2020/160152
PCT Pub. Date: Aug. 6, 2020

(65) Prior Publication Data
US 2022/0105509 A1    Apr. 7, 2022

Related U.S. Application Data

(60) Provisional application No. 62/799,602, filed on Jan. 31, 2019.

(51) Int. Cl.
*B01L 3/00* (2006.01)

(52) U.S. Cl.
CPC ... *B01L 3/502707* (2013.01); *B01L 3/502784* (2013.01); *B01L 2200/0673* (2013.01);
(Continued)

(58) Field of Classification Search
CPC ........ G01J 5/047; G01J 5/0806; G01J 5/0808; G01J 5/0831; G01J 5/53; G01J 5/532;
(Continued)

(56) References Cited

U.S. PATENT DOCUMENTS

| | | |
|---|---|---|
| 9,142,510 B2 | 9/2015 | Lee et al. |
| 2012/0121481 A1 | 5/2012 | Romanowsky et al. |

(Continued)

FOREIGN PATENT DOCUMENTS

| | | |
|---|---|---|
| WO | 2016/138175 A1 | 9/2016 |
| WO | 2017/106252 A1 | 6/2017 |

OTHER PUBLICATIONS

Wikipedia.com Emulsion, Dec. 13, 2018, entirety of document esp. p. 1, para 2.
(Continued)

*Primary Examiner* — Jennifer Wecker
*Assistant Examiner* — Jonathan Bortoli
(74) *Attorney, Agent, or Firm* — BakerHostetler

(57) ABSTRACT

In one embodiment, a microfluidic device has a substrate that defines a first inlet for a continuous phase fluid, a second inlet for a dispersed phase fluid, and droplet generators that can produce micro-droplets from the continuous and dispersed phase fluids. The substrate defines (i) a plurality of delivery channels in fluid communication with the first and second inlets, each delivery channel having a first dimension along a first plane that is perpendicular to a transverse direction, and (ii) a plurality of trenches that extend from the delivery channels towards the droplet generators along the transverse direction. Each trench has a second dimension along a plane that is perpendicular to the transverse direction that is smaller than the first dimension. The substrate defines (Continued)

a plurality of vias that extend from the trenches to the droplet generators so as to fluidly connect the delivery channels with the droplet generators.

9 Claims, 18 Drawing Sheets

(52) U.S. Cl.
CPC ....... *B01L 2200/12* (2013.01); *B01L 2200/16* (2013.01); *B01L 2300/087* (2013.01)

(58) Field of Classification Search
CPC ......... B01L 2200/0673; B01L 2200/12; B01L 2200/16; B01L 2300/087; B01L 3/502707; B01L 3/502784; B01J 19/0093; B01J 2219/00015; B01J 2219/0079; B01J 2219/00828; B01J 2219/00864
See application file for complete search history.

(56) References Cited

U.S. PATENT DOCUMENTS

| | | | |
|---|---|---|---|
| 2014/0220350 | A1 | 8/2014 | Kim et al. |
| 2018/0236450 | A1* | 8/2018 | Issadore .............. B01F 33/3011 |
| 2018/0369810 | A1 | 12/2018 | Yadavali et al. |

OTHER PUBLICATIONS

Amstad et al., "Robust scalable high throughput production of monodisperse drops", Lab on a Chip, vol. 16, 2016, pp. 4163-4172.
Barbier, et al., "Producing droplets in parallel microfluidic systems", Phys. Rev. E, vol. 74, 2006, 046306.
Cheng Z., et al., "Multifunctional nanoparticles: cost versus benefit of adding targeting and imaging capabilities," Science, vol. 338, 2012, pp. 903-910.
Eggersdorfer, et al., "Tandem emulsification for high-throughput production of double emulsions", Lab on a Chip, vol. 17, 2017, pp. 936-942.
Gambino et al., "An overview of through-silicon-via technology and manufacturing challenges," Microelectronic Engineering, vol. 135, 2015, pp. 73-106.
Hall et al., "A 256 Pixel Magnetoresistive Biosensor Microarray in 0.18 μm CMOS," IEEE Journal of solid-state circuits. vol. 48, 2013, pp. 1290-1301.
Holtze, C., "Large-scale droplet production in microfluidic devices—an industrial perspective," Journal of Physics D: Applied Physics, vol. 46, No. 11, Feb. 22, 2013, 114008.
Hur et al., "Sheathless inertial cell ordering for extreme throughput flow cytometry," Lab on a Chip, vol. 10, 2010, pp. 274-280.
Issadore et al., "Ultrasensitive Clinical Enumeration of Rare Cells ex Vivo Using a Micro-Hall Detector," Science translational Medicine, vol. 4, Issue 141, 2012, pp. 1-22.
Jeong et al., "Kilo-scale droplet generation in three-dimensional monolithic elastomer device (3D MED)", Lab on a Chip, vol. 15, 2015, pp. 4387-4392.
Jeong et al., "Moldable Perfluoropolyether-Polyethylene Glycol Networks with Tunable Wettability and Solvent Resistance for Rapid Prototyping of Droplet Microfluidics", Chemistry of Materials, vol. 30, 2018, pp. 2583-2588.
Jeong et al., "Recent developments in scale-up of microfluidic emulsion generation via parallelization," Korean Journal of Chemical Engineering, vol. 33, 2016, pp. 1757-1766.
Jeong et al., Liter-scale production of uniform gas bubbles via parallelization of flow-focusing generators, Lab on a Chip, vol. 17, No. 15, pp. 2017, 2667-2673.
Karnik et al., "Microfluidic platform for controlled synthesis of polymeric nanoparticles," Nano Letters, vol. 8, 2008, pp. 2906-2912.
Kim et al., "Optofluidic ultrahigh-throughput detection of fluorescent drops," Lab on a Chip, vol. 15, 2015, pp. 1417-1423.
Koyanagi et al., "High-density through silicon vias for 3-D LSIs," Proceedings of the IEEE, vol. 97, 2009, pp. 49-59.
Lau, "Overview and outlook of through-silicon via (TSV) and 3D integrations," Microelectronics International, vol. 28, 2011, pp. 8-22.
Li et al., "Simultaneous generation of droplets with different dimensions in parallel integrated microfluidic droplet generators", Soft Matter, vol. 4, 2008, pp. 258-262.
Lim et al., "Parallel microfluidic synthesis of size-tunable polymeric nanoparticles using 3D flow focusing towards in vivo study", Nanomedicine: Nanotechnology, Biology and Medicine, vol. 10, No. 2, 2014, pp. 401-409.
Min et al., "Integrated microHall magnetometer to measure the magnetic properties of nanoparticles," Lab on a Chip, vol. 17, 2017, pp. 4000-4007.
Motoyoshi, "Through-silicon via (TSV)," Proceedings of the IEEE, vol. 97, 2009, pp. 43-48.
Nissisako et al., "A microfluidic cross-flowing emulsion generator for producing biphasic droplets and anisotropically shaped polymer particles", Microfluidics and Nanofluidics, vol. 9, 2010, pp. 427-437.
Nissisako et al., "Microfluidic large-scale integration on a chip for mass production of monodisperse droplets and particles", Lab on a Chip, vol. 8, 2008, pp. 287-293.
Nunes et al., "Fabricating shaped microfibers with inertial microfluidics," Advanced Materials, vol. 26, 2014, pp. 3712-3717.
Puech et al., "Fabrication of 3D packaging TSV using DRIE," Symposium on Design, Test, Integration and Packaging of MEMS/MOEMS, 2008, pp. 109-114.
Romanowsky M. B. et al., "High throughput production of single core double emulsions in a parallelized microfluidic device,", Lab Chip, vol. 12, 2012, pp. 802-807.
Shah et al., "Designer emulsions using microfluidics ," Materials today, vol. 11, 2008, pp. 18-27.
Stoeber, B., et al., "Fluid injection through out-of-plane microneedles," 1st Annual International Ieee-Embs Special Topic Conference On Microtechnologies in Medicine and Biology, Feb. 2000, pp. 224-228.
Tabata et al., "Anisotropic etching of silicon in TMAH solutions," Sensors and Actuators A: Physical, vol. 34, 1992, pp. 51-57.
Temiz et al., "Die-Level TSV Fabrication Platform for CMOS-MEMS Integration," The 16th International Conference on Solid-State Sensors, Actuators and Microsystems, June 509, 2011, pp. 1799-1802.
Wu et al., "High aspect ratio silicon etch: A review," Journal of Applied Physics, vol. 108, Issue 9, 2010, pp. 1-21.
Xu et al., "The generation of highly monodisperse droplets through the breakup of hydrodynamically focused microthread in a microfluidic device, " Applied Physics Letters, vol. 85, 2004, pp. 3726-3728.
Yadavali et al., "Silicon and glass very large scale microfluidic droplet integration for terascale generation of polymer microparticles ," Nature Communications, vol. 9, 2018, 1222, pp. 1-9.
Yelleswarapu et al., "Ultra-high throughput detection (1 million droplets per second) of fluorescent droplets using a cell phone camera and time domain encoded optofluidics," Lab on a Chip, vol. 17, 2017, pp. 1083-1094.

* cited by examiner

SILICON CHIP HAVING MULTI-ZONE THROUGH SILICON VIAS AND METHOD OF MANUFACTURING THE SAME

CROSS-REFERENCE TO RELATED APPLICATIONS

This application is the National Stage of International Patent Application No. PCT/US2020/015684, filed Jan. 29, 2020, which claims the benefit of U.S. Provisional Application No. 62/799,602, filed Jan. 31, 2019, the disclosures of which applications are incorporated herein by reference in their entireties for any and all purposes.

BACKGROUND

Recently, massively parallelized microfluidic chips fabricated in silicon substrates and glass have been developed to increase the throughput of microfluidic materials synthesis to the industrial scale. These parallelized microfluidic chips include relatively large arrays of through silicon vias (TSVs) to deliver fluid from delivery channels to the parallelized devices. It is preferred that these TSVs have relatively small footprints to enable to the features to be packed densely into a single chip. At the same time, debris generation and wafer warping during manufacturing should be minimized to enable bonding of the glass to the silicon substrates. Accordingly, there is a long-felt need in the art for TSV-containing devices with dense features as well as related methods for fabricating such devices.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown.

The file of this patent or application contains at least one drawing/photograph executed in color. Copies of this patent or patent application publication with color drawing(s)/photograph(s) will be provided by the Office upon request and payment of the necessary fee. In the drawings:

FIG. 4a shows an enlarged view of a portion of the microfluidic device of FIG. 1, the portion comprising a plurality of flow-focusing droplet generators according to another embodiment;

FIG. 4b shows an enlarged view of a junction of one of the flow-focusing droplet generators of FIG. 4a;

FIG. 4c shows an enlarged view of a portion of a droplet generator connected to a via that is configured to provide a disperse phase fluid to the droplet generator;

FIG. 4d shows an enlarged view of a portion of a droplet generator connected to a via that is configured to provide a continuous phase fluid to the droplet generator;

DETAILED DESCRIPTION OF ILLUSTRATIVE EMBODIMENTS

Figure 1:
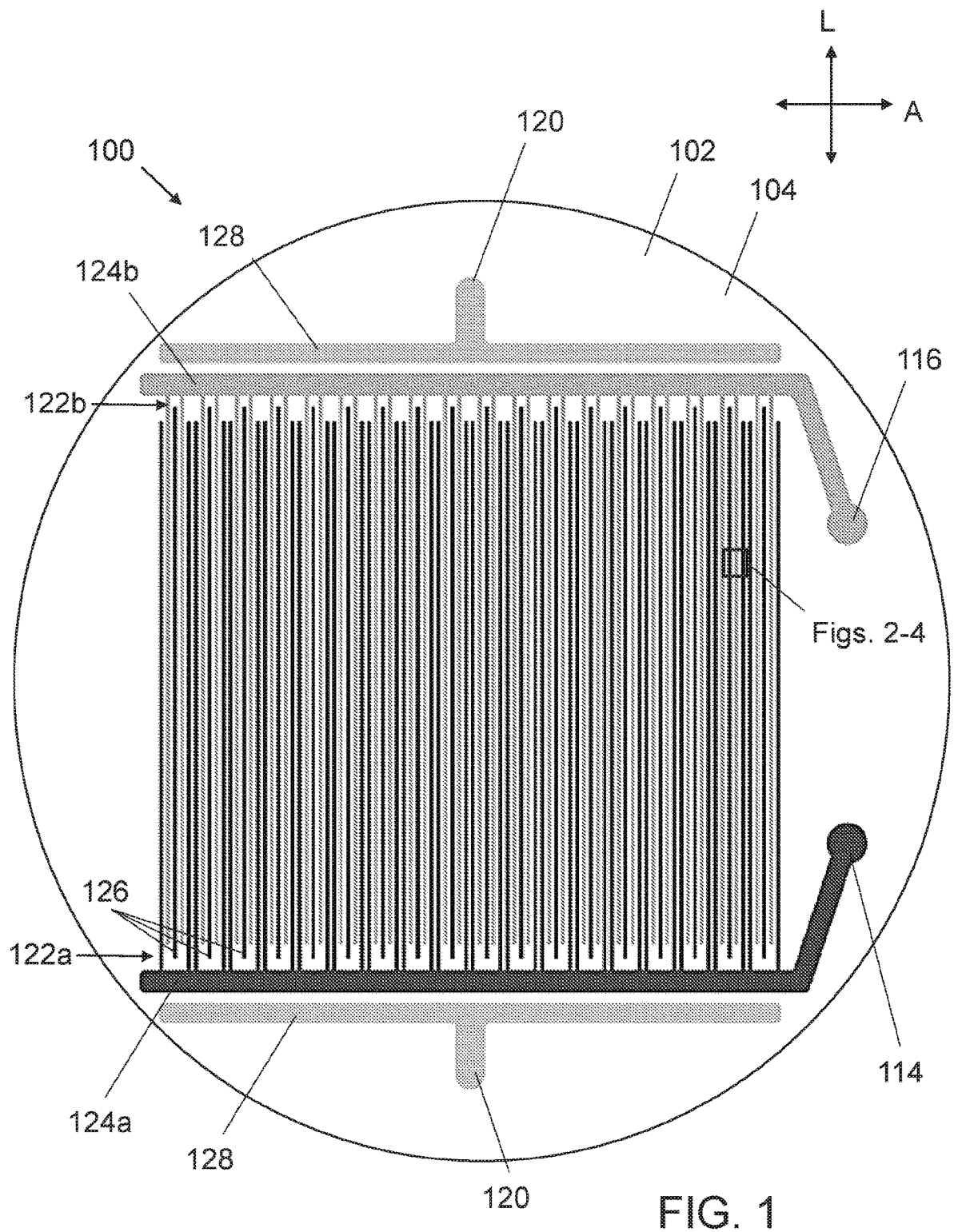
FIG. 1 shows a planar view of a microfluidic device according to one embodiment.
Figure 5:
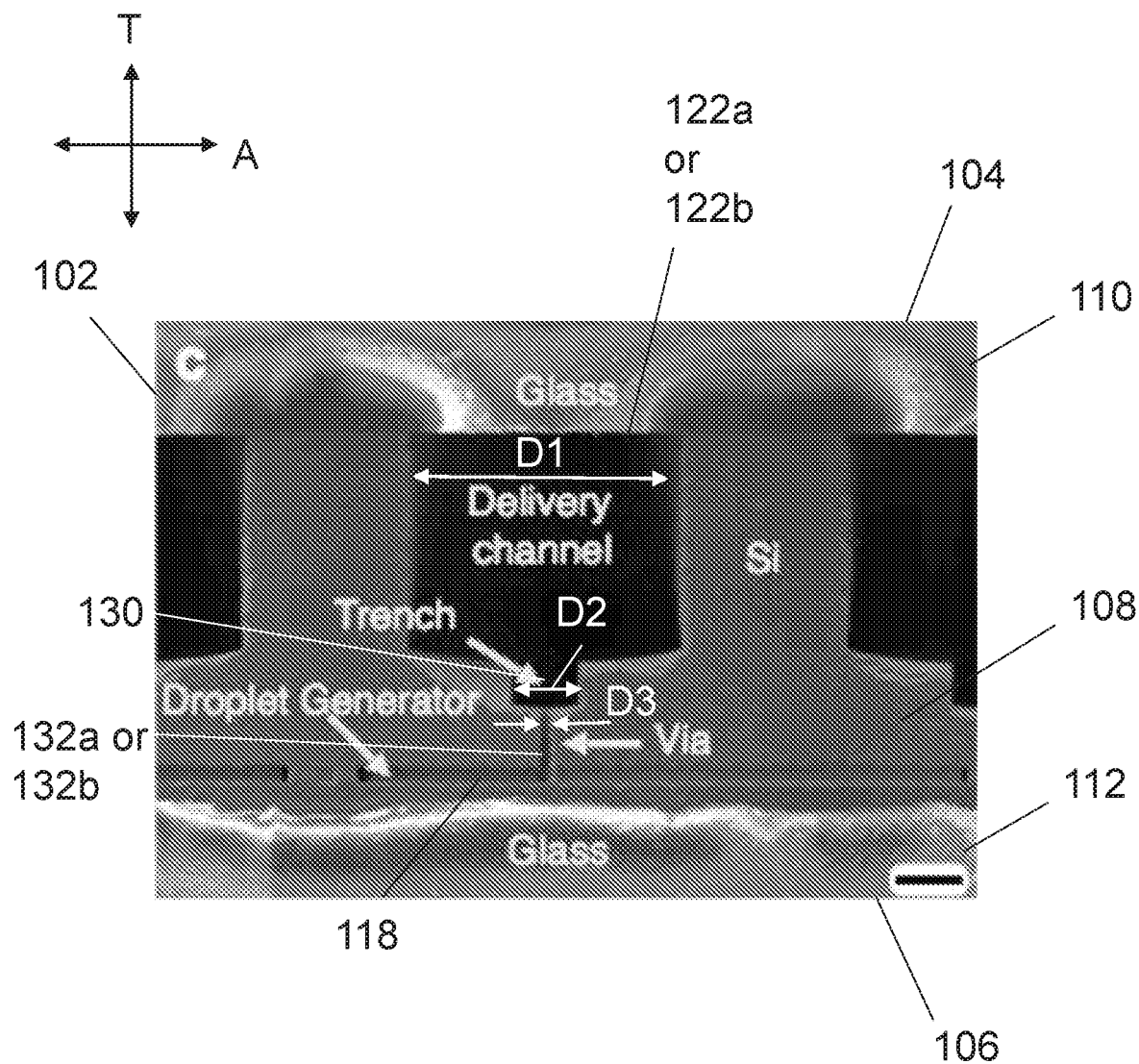
FIG. 5 shows a cross-sectional view of a portion of the microfluidic device of FIG. 1.

Referring to FIGS. 1 and 5, a microfluidic device 100 that is configured to generate micro-droplets on a commercial scale. The microfluidic device 100 comprises at least one substrate 102 having a first surface 104 and a second surface 106 that are offset from one another along a transverse direction T. The first and second surfaces 104 and 106 can each extend along a plane that extends along a longitudinal direction L and a lateral direction A, wherein the longitudinal direction L, the lateral direction A, and transverse direction T are perpendicular to one another. Thus, the first and second surfaces 104 and 106 can each be substantially planar. The at least one substrate 102 can be formed from at least one wafer.

One of ordinary skill in the art, upon reading this disclosure, will understand that suitable materials for use as wafers include any material which may be manipulated according to the microfluidic device manufacturing methods described herein (e.g., etching by deep reactive ion etching or advanced oxide etching) as well as be subject to high temperature and/or pressure and/or low interaction with the particular fluids to be used in the application (i.e., generation of microbubbles/microdroplets).

Each of the at least one wafer 108 may be a silicon wafer, a glass wafer, a quartz wafer, or the like. In one embodiment, the substrate 102 can be formed of a single silicon wafer 108. In another embodiment, substrate 102 can formed of a plurality of wafers that are bonded together, wherein at least one wafer is silicon. Additionally or alternatively, the substrate 102 can include two or more wafers comprised of different materials, such as, e.g., at least one silicon wafer 108 and at least one glass wafer 110 and 112. Wafers of the substrate 102 can be bonded together by any suitable means, such as direct bonding, e.g., between two silicon wafers, and/or by anodic bonding, e.g., between a silicon wafer 108 and a glass wafer 110 or 112. In FIG. 5, one embodiment is shown having at least one silicon wafer 108 sandwiched between a pair of glass wafers 110 and 112.

Figure 2:
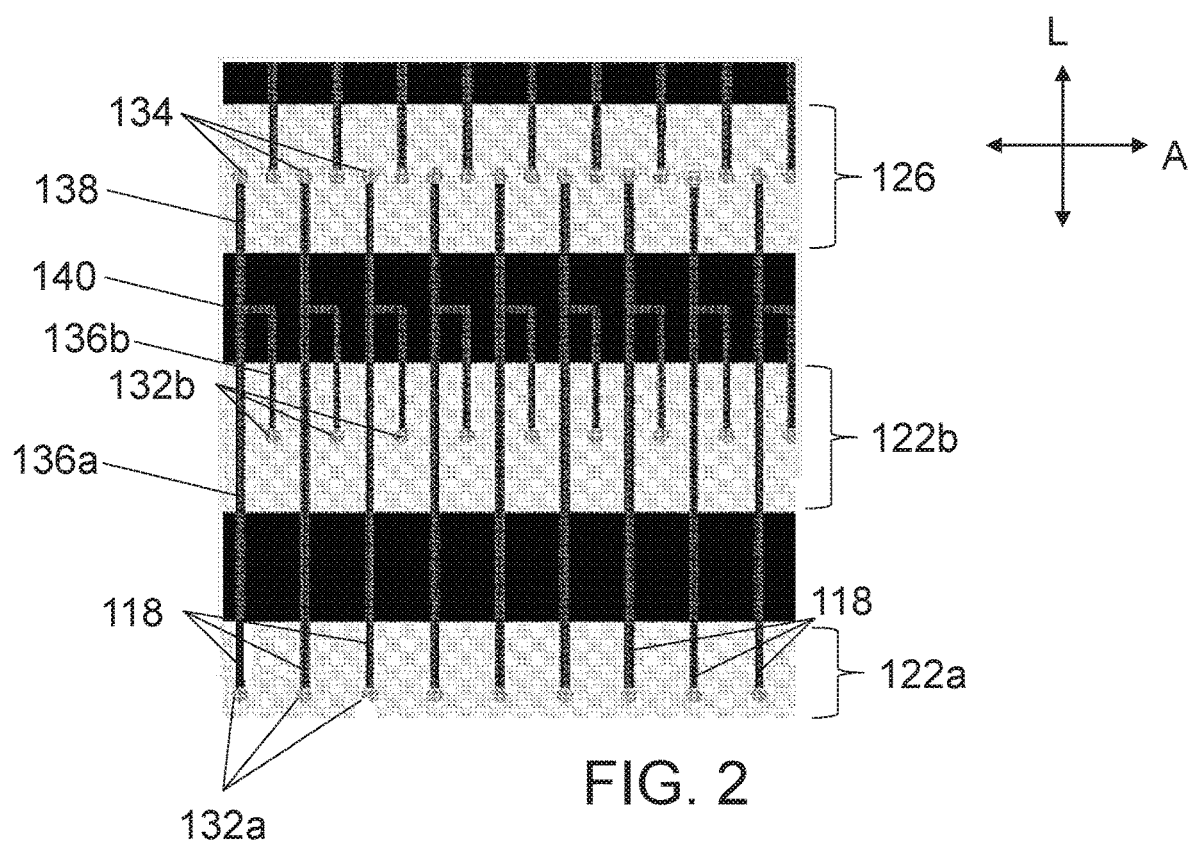
FIG. 2 shows an enlarged view of a portion of the microfluidic device of FIG. 1, the portion comprising a plurality of T-junction droplet generators according to one embodiment.
Figure 3:
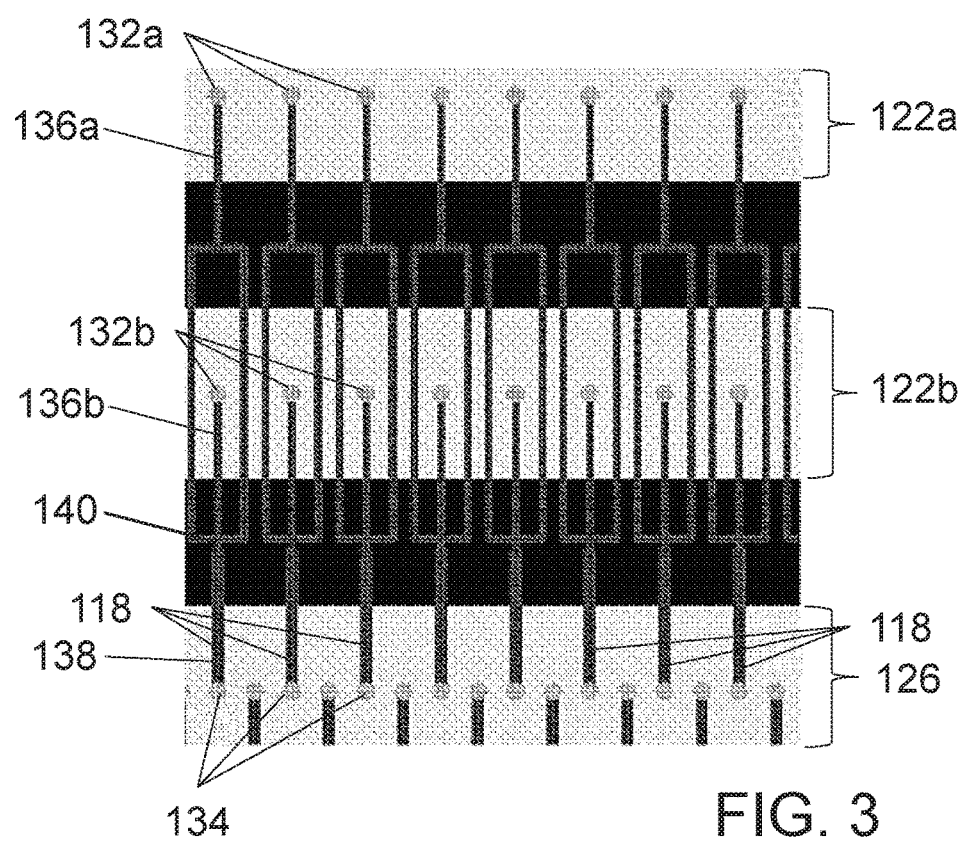
FIG. 3 shows an enlarged view of a portion of the microfluidic device of FIG. 1, the portion comprising a plurality of flow-focusing droplet generators according to one embodiment.
Figure 4:
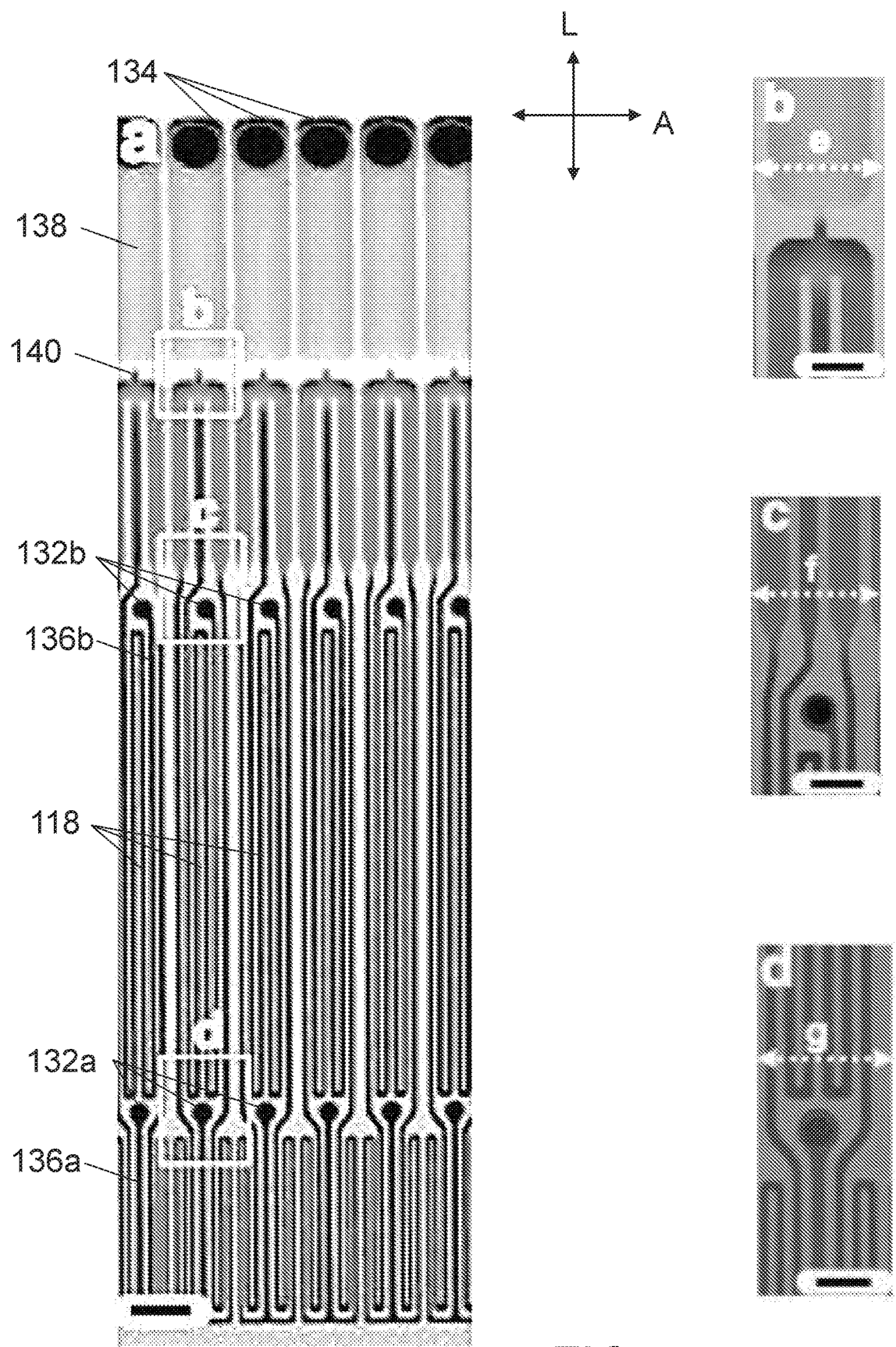

The at least one substrate 102 defines at least one first inlet 114 configured to receive a continuous phase fluid, and at least one second inlet 116 configured to receive a dispersed phase fluid. As used herein, the phrase "continuous phase fluid" is used to describe the fluid into which droplets flow into, and the phrase "disperse phase fluid" is used to describe the fluid from which droplets are generated. Moreover, as used herein, the term "fluid" is not limited to liquid substances, but may include substances in the gaseous phase. The at least one substrate 102 defines a plurality of droplet generators 118 (shown in the enlarged views of FIGS. 2-4) configured to produce micro-droplets from the continuous phase fluid and the dispersed phase fluid, and at least one outlet 120 configured to output the micro-droplets. Each droplet generator 118 can be configured as a T-junction droplet generator as shown in FIG. 2, as a flow-focusing droplet generator as shown in FIGS. 3 and 4, or as any other suitable droplet generator.

The at least one substrate 102 defines a plurality of channels that fluidly connect the at least one first inlet 114, the at least one second inlet 116, and the at least one outlet 120 to the droplet generators 118. The plurality of channels includes a plurality of delivery channels 122a and 122b in fluid communication with the at least one first inlet 114 and the at least one second inlet 116. As shown in FIG. 5, the plurality of delivery channels 122a and 122b are offset from the plurality of droplet generators 118 with respect to the transverse direction T, and can be fluidly connected to the droplet generators 118 through trenches 130 and vias 132a and 132b. Thus, each of the delivery channels can be disposed above or below the droplet generators 118 with respect to the transverse direction T. Moreover, as shown in FIG. 5, each delivery channel 122a and 122b has a first cross-sectional dimension D1 along a first plane that is perpendicular to the transverse direction T.

The plurality of delivery channels can include a first set of delivery channels 122a in fluid communication with the at least one first inlet 114, and a second set of delivery channels 122b in fluid communication with the at least one second inlet 116. Each delivery channel 122a and 122b can be elongate along the longitudinal direction L. Further, the delivery channels 122a and 122b can be offset from one another along the lateral direction A.

The plurality of channels can include at least one supply channel that fluidly couples the delivery channels to the at least first and second inlets 114 and 116. The at least one supply channel can include a first supply channel 124a that fluidly couples the first set of delivery channels 122a to the at least one first inlet 114, and a second supply channel 124b that fluidly couples the second set of delivery channels 122b to the at least one second inlet 116. The first and second supply channels 124a and 124b can be elongate along the lateral direction A. Thus, the first set of delivery channels 122a can extend from the first supply channel 124a, and the second set of delivery channels 122b can extend from the second supply channel 124b.

Referring more specifically to FIG. 5, the at least one substrate 102 defines a plurality of trenches 130 and a plurality of vias 132a and 132b. The plurality of trenches 130 extend from the delivery channels 122a and 122b towards the droplet generators 118 along the transverse direction T. Each trench 130 is elongate along the longitudinal direction L. Each trench 130 has a second cross-sectional dimension D2 along a second plane that is perpendicular to the transverse direction T. The second cross-sectional dimension D2 is smaller than the first cross-sectional dimension D1. Each of the first and second cross-sectional dimensions D1 and D2 can be measured along the lateral direction.

The plurality of vias 132a and 132b extend from the trenches 130 to the droplet generators 118 along the transverse direction T so as to fluidly connect the delivery channels 122a and 122b with the droplet generators 118. In some examples where the substrate 102 comprises at least one silicon wafer, the vias can be through silicon vias (TSVs). The vias 132a and 132b can have a closed cross-sectional shape in a plane that is perpendicular to the transverse direction T. For example, the vias 132a and 132b can have a circular cross-sectional shape or any other suitable closed shape. In one example, the vias 132a and 132b can be through silicon vias. As shown in FIG. 5, each via 132 has a third cross-sectional dimension D3 in a third plane that is perpendicular to the transverse direction T. The third cross-sectional dimension D3 is smaller than the second cross-sectional dimension D2. The third cross-sectional dimension D3 can be measured in along the lateral direction L.

The plurality of vias 132a and 132b includes a plurality of sets of vias 132a and 132b. The vias 132a and 132b in each set are offset from one another along the longitudinal direction L. The vias 132a and 132b in each set extend from a respective one of the trenches 130 to a respective set of the droplet generators 118.

Referring again to FIGS. 1 and 5, the plurality of channels can include a set of outlet collection channels 126 that fluidly connect the at least one outlet 120 to the droplet generators 118. The plurality of outlet collection channels 126 are offset from the plurality of droplet generators 118 with respect to the transverse direction T, and can be fluidly connected to the droplet generators 118 through vias 134 (shown in FIGS. 2-4). In some embodiments, the vias 134 can extend from the droplet generators 118 to the outlet collection channels 126. In other embodiments, the at least one substrate 102 can define a plurality of trenches (not shown) that are similar to trenches 130 and that extend from the outlet collection channels 126 to the vias 134. Thus, each of the outlet collection channels 126 can be disposed above or below the droplet generators 118 with respect to the transverse direction T.

Each of the outlet collection channels 126 can be elongate along the longitudinal direction L. The plurality of vias 134 includes a plurality of sets of vias 134. The vias 134 in each set are offset from one another along the longitudinal direction L (as shown in FIGS. 2-4). The vias 134 in each set extend from a respective one of the outlet collection channels 126 to a respective set of the droplet generators 118.

The outlet collection channels 126 can be offset from one another along the lateral direction A. As shown in FIG. 1, the delivery channels 122a and 122b and the outlet collection channels 126 can be arranged in the following order, which can be repeated: delivery channel 122a, delivery channel 122b, outlet channel 126, delivery channel 122b, delivery channel 122a. It will be understood that, in alternative embodiments, the channels can be arranged in any other suitable order for fluidly connecting the droplet generators 118 to the inlets 114 and 116 and at least one outlet 120.

The plurality of channels can include at least one outlet channel 128 that fluidly couples the outlet collection channels 126 to the at least one outlet 120. The at least one outlet channel 128 can be elongate along the lateral direction A. The at least one substrate 102 can define underpass channels 133 (shown in FIG. 6d) that extend under the supply channels 124a and 124b so as to fluidly couple the outlet collection channels 126 to the at least one outlet channel 128.

It will be understood that the plurality of channels can be configured in any suitable arrangement, including arrangements that differ from that shown in FIG. 1. For example, the channels can be configured as shown in FIG. 1A of WO 2017/106252, the teachings of which are hereby incorporated by reference as if set forth in their entirety herein. In FIG. 1A, the first and second supply channels are defined on a first lateral side of the substrate and the outlet channel is disposed on a second lateral side of the substrate. The outlet collection channels extend from the outlet channel without using underpass channels. The delivery channels for the first supply channel extends from the first supply channel without using underpass channels. The delivery channels for the second supply channel are fluidly coupled to the second supply channel using underpass channels that extend under the first supply channel.

Turning to FIGS. 2-4, each droplet generator 118 includes at least one first generator inlet channel 136a, at least one second generator inlet channel 136b, and at least one generator outlet channel 138. The at least one first generator inlet channel 136a, the at least one second generator inlet channel 136b, and the at least one generator outlet channel 138 can intersect at a junction 140. The junction 140 can be a T-junction as shown in FIG. 2 or a flow-focusing junction as shown in FIGS. 3 and 4. Further, the at least one first generator inlet channel 136a, at least one second generator inlet channel 136b, and at least one generator outlet channel 138 can each be routed in any suitable routing to the junction 140. FIGS. 3 and 4 show two different example routings for a flow-focusing junction. It will be understood that other routings are possible within the scope of the present disclosure.

The microfabrication of silicon to create highly parallelized microfluidic devices presents several fabrication challenges that can adversely affect the performance and yield of chips. For instance, these devices can include relatively small foot-print TSVs that allow many microfluidic devices to be packed onto a single wafer and can include features to be microfabricated on both sides of the substrate. These devices are also preferably manufactured with minimal debris and minimal wafer warping so that the substrate can be bonded to glass wafers. Consequently, at least some conventional TSV forming techniques might be limited in their ability to form TSVs that are sufficiently small enough to allow many microfluidic devices to be packed onto a single wafer. Therefore, discussed below are methods of fabricating microfluidic devices that have such sufficiently small TSVs. The methods can include at least one of (i) forming a stress relieved $SiO_2$ membrane as an etch-stop for etching, in addition to, or in lieu of a conventionally used carrier wafer, and (ii) forming trenches in at least some of the delivery channels.

Figure 10:
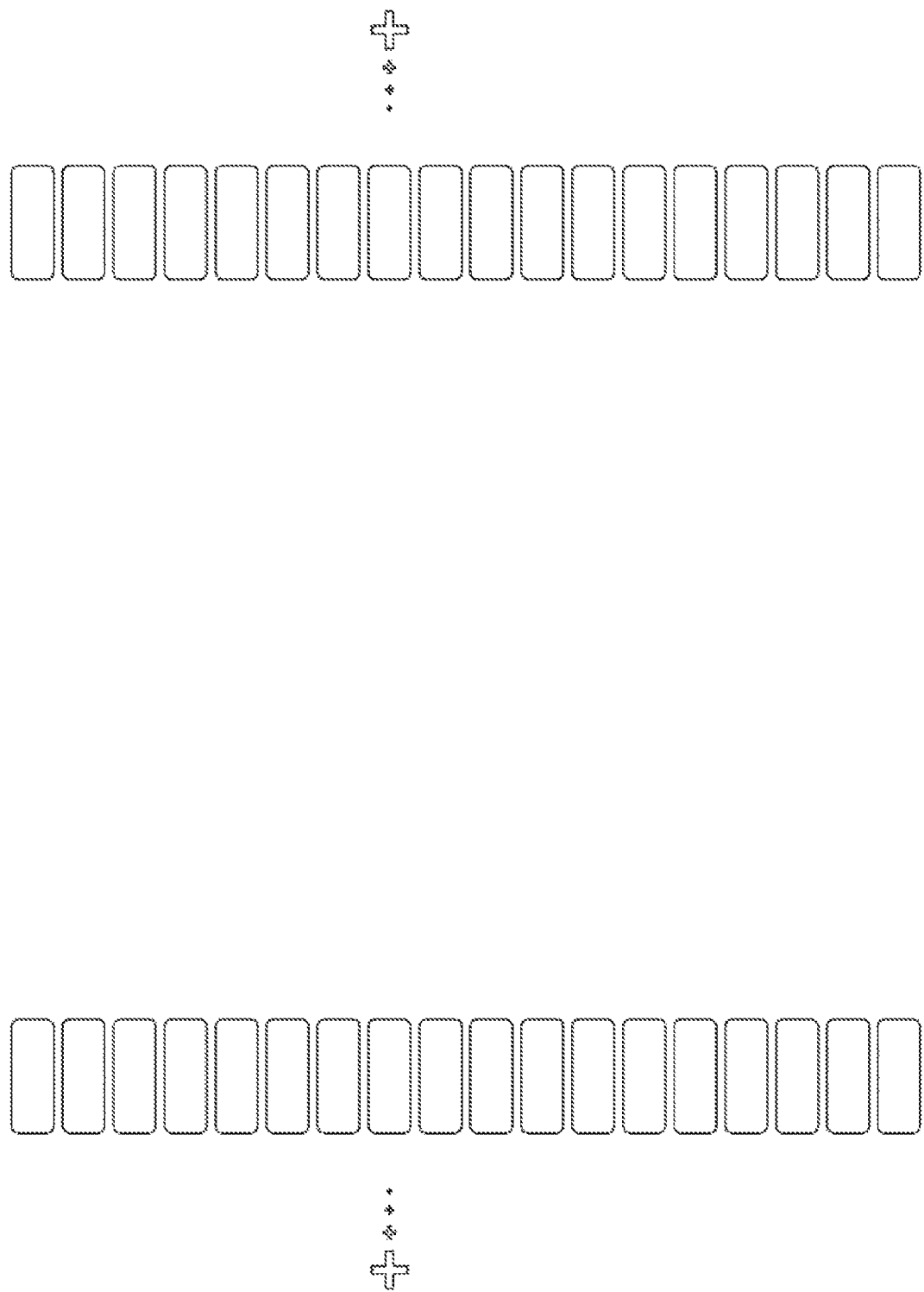
FIG. 10 shows a mask according to one embodiment that can be used in FIG. 6d to form the underpass channels.
Figure 11:
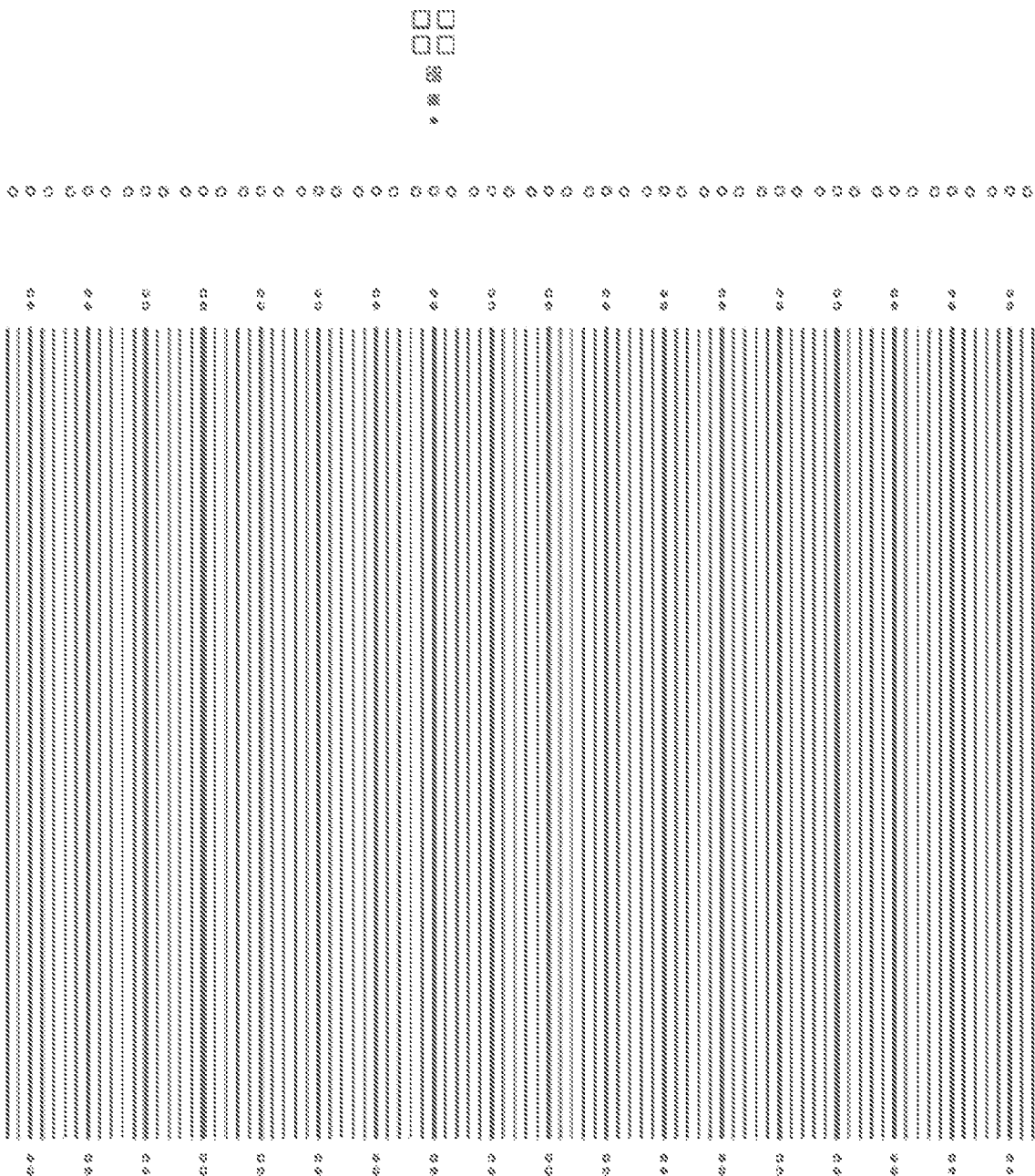
FIG. 11 shows a mask according to one embodiment that can be used in FIG. 6e to form the through silicon vias.
Figure 12:
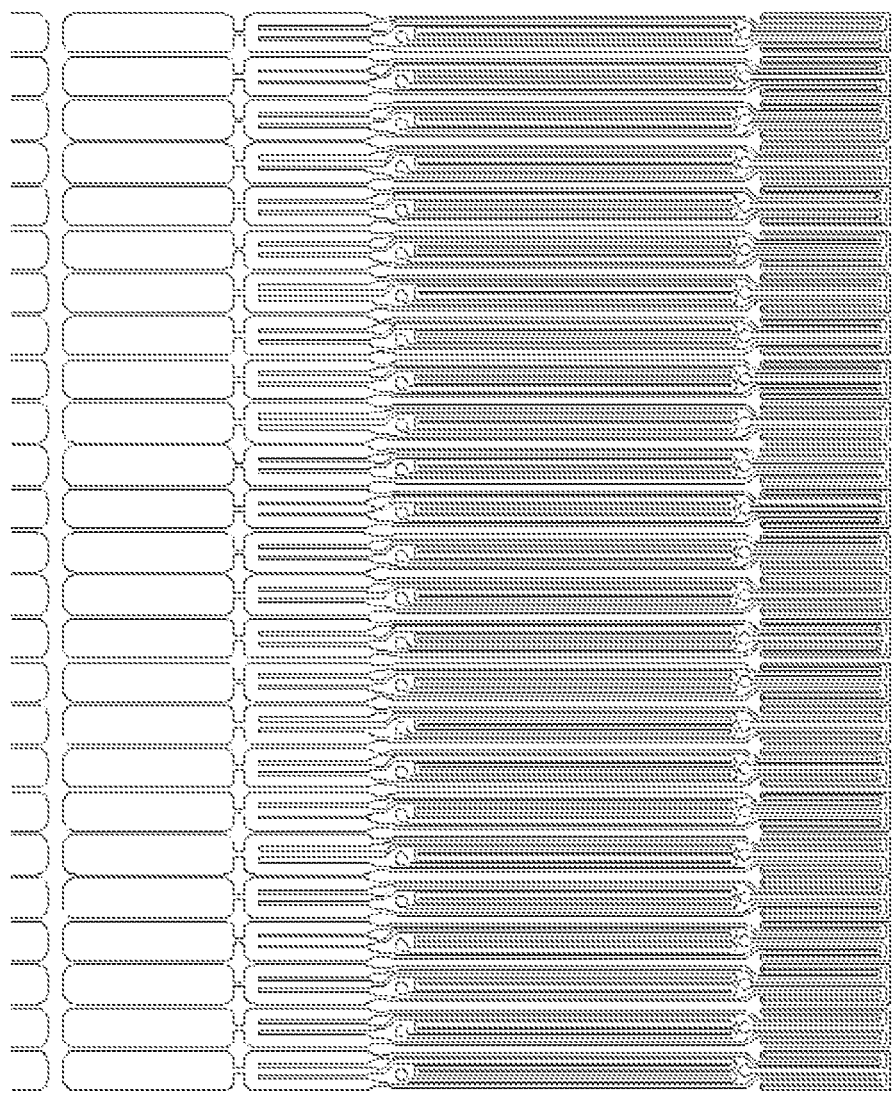
FIG. 12 shows a mask according to one embodiment that can be used in FIG. 6f to form the droplet generators.

Turning now to FIGS. 6 to 12, a method of fabricating a microfluidic device is shown according to one embodiment. The method can be carried out using a plurality of mask layers, including a layer (Layer-1) for forming the delivery channels 122a and 122b (FIG. 7), a layer (Layer-2) for forming the trenches 130 (FIG. 8), a layer (Layer-3) for forming oxide mechanical stress relief (FIG. 9), a layer (Layer-4) for forming under-pass channels (FIG. 10), a layer (Layer-5) for forming through silicon vias 132 (FIG. 11), and a layer (Layer-6) for forming droplet generator channels (FIG. 12). The masks can be prepared using any suitable technique. In one experiment carried out by the inventors, the masks can be photomasks can be prepared on chrome-coated soda lime glass (AZ1500) using a Heidelberg 66 plus mask writer and a 10 mm write head. However, it will be understood that other photomasks can be used within the scope of this disclosure. After exposure, the photoresists can be developed in an MF 319 developer for 1 minute and in chrome etchant for a minute, and then the remaining photoresist can be removed by immersion in 1165 developer at 60 C with sonication for 5 minutes.

In general, the microfluidic device can be fabricated in layers, where each layer is lithographically patterned, developed, and etched. To form each layer, a photoresist can be applied to the silicon substrate. In one example, the photoresist can be S1805 photoresist that is mixed with acetone (1:8) and the resist can be coated to its required thickness. However, it will be understood that any other suitable photoresist can be used. The photoresist can be a positive photoresist or a negative photoresist as desired.

To form each layer, the photoresist can be applied to the silicone substrate to its required thickness using any suitable coating technique such as spray coating or spin coating. Spray coating may be preferable over spin coating due to the deep high aspect ratio features on the chip, which might not receive a uniform coating with spin coating. After each fabrication step, the substrate can be cleaned using any suitable cleaning technique. For example, the substrate can be cleaned using a Spin Rinse Dryer (SRD) (e.g., rinse with water at 500 rpm for 90 seconds and dry in nitrogen air at 3000 rpm for 90 seconds) after developing the photoresist and before etching. The various features of each layer can be etched using any suitable etching process, such as (without limitation), deep reactive ion etching (SPTS Rapier Si DRIE).

Figure 6:
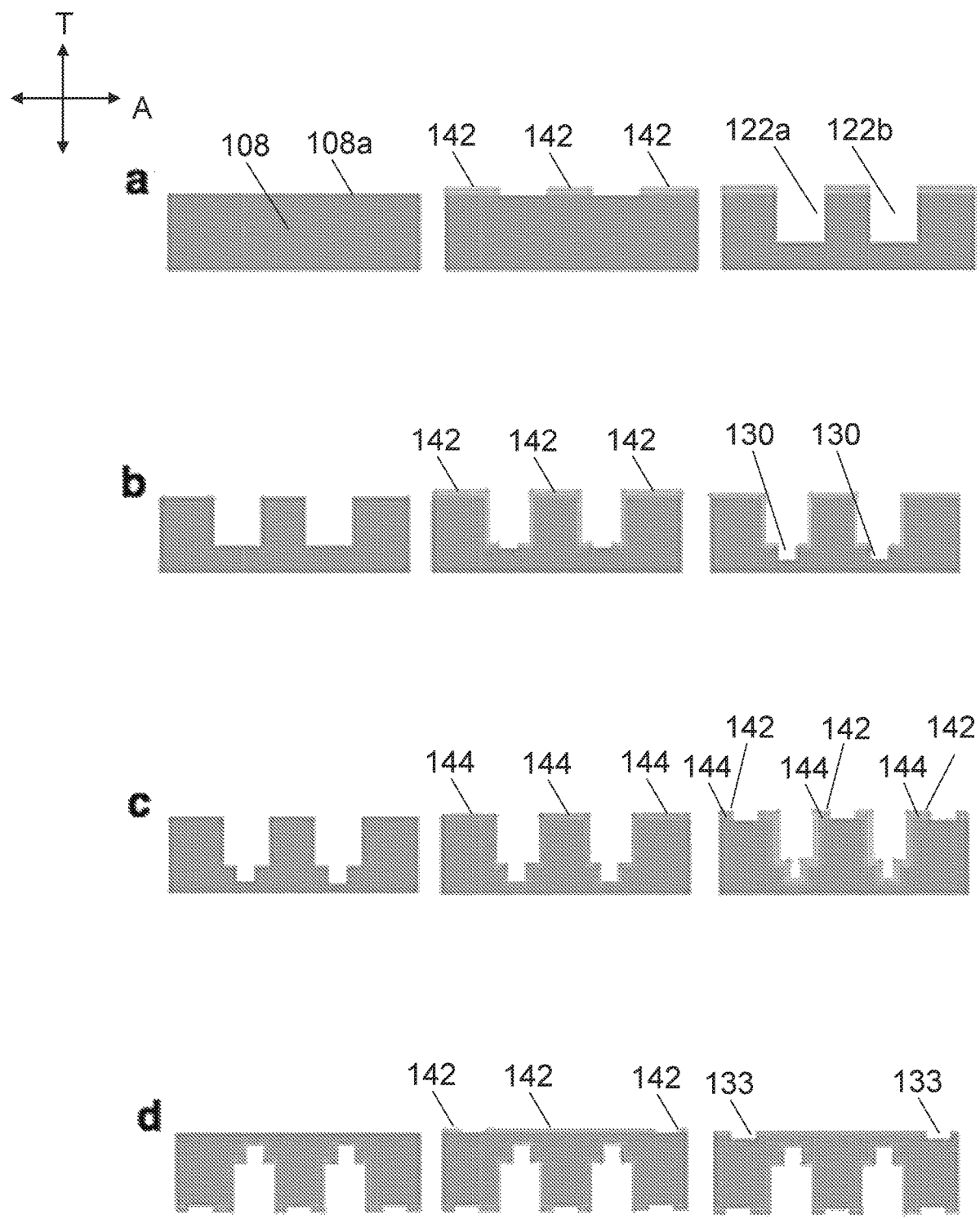
FIG. 6a shows a step of forming delivery channels in a silicon substrate of the microfluidic device of FIG. 1 according to one embodiment.
FIG. 6b shows a step of forming trenches in the silicon substrate of the microfluidic device of FIG. 1 according to one embodiment.
FIG. 6c shows a step of forming a dioxide on the silicon substrate of the microfluidic device of FIG. 1 according to one embodiment.
FIG. 6d shows a step of forming underpass channels in the silicon substrate of the microfluidic device of FIG. 1 according to one embodiment.
FIG. 6e shows a step of forming through silicon vias in the silicon substrate of the microfluidic device of FIG. 1 according to one embodiment.
FIG. 6f shows a step of forming droplet generators in the silicon substrate of the microfluidic device of FIG. 1 according to one embodiment.
FIG. 6g shows a step of bonding glass substrates to the silicon substrate of the microfluidic device of FIG. 1 according to one embodiment.
Figure 6:
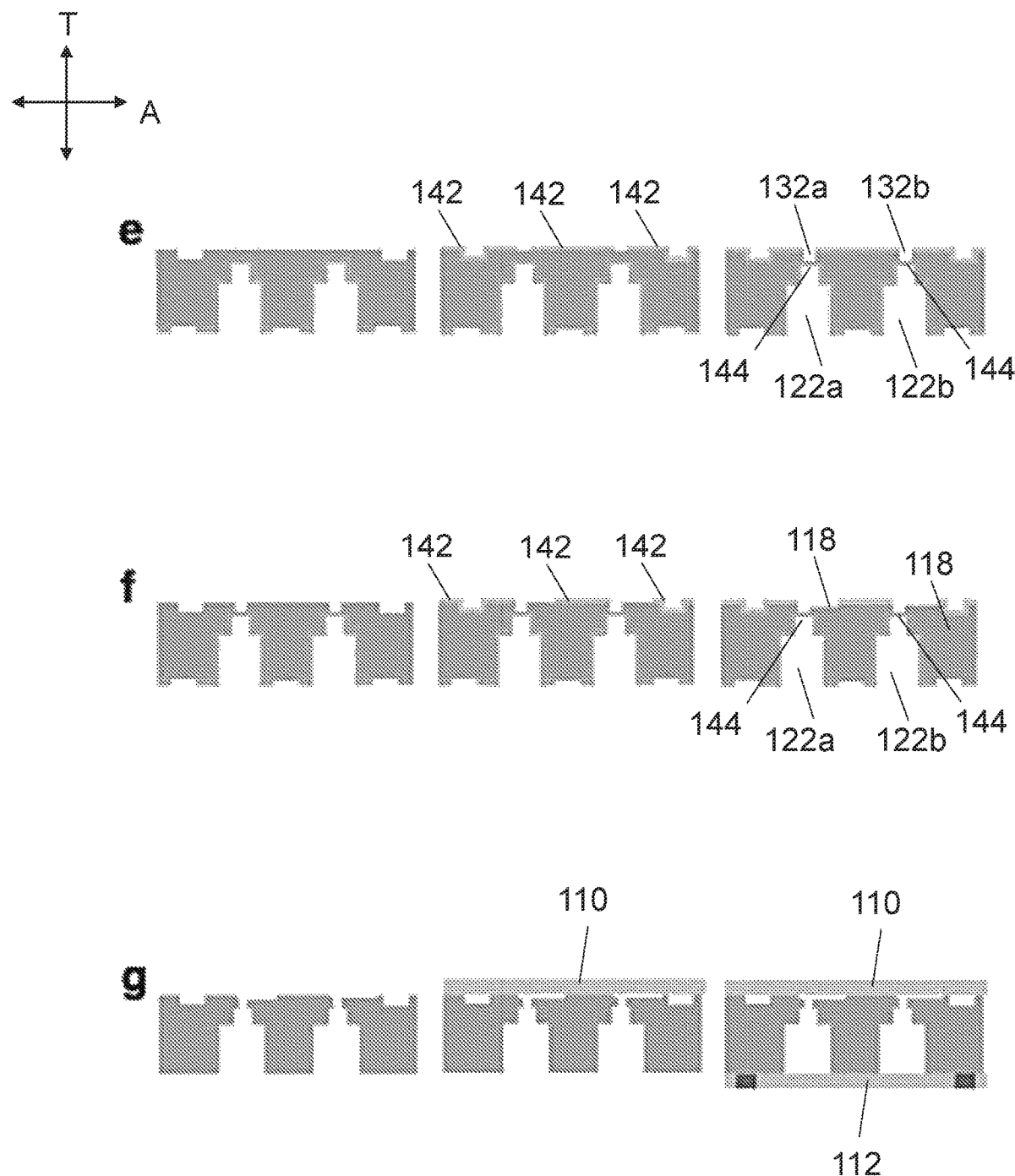

Referring more specifically to FIG. 6, step "a" comprises forming the delivery channels 122a and 122b (Layer-1) in a first surface 108a of a silicon substrate 108. For instance, the first surface 108a of the silicon substrate 108 can be coated with photoresist 142. A photomask, such as the photomask shown in FIG. 7, can be applied to the first surface 108a of the silicon substrate 108. The exposed portions of the photoresist 142 that are not covered by the photomask can be exposed to light, resulting in the photoresist 142 directly above the delivery channels 122a and 122b being weaker than the photoresist 142 that is not directly above the delivery channels 122a and 122b. The photoresist 142 directly above the delivery channels 122a and 122b can then be removed (as shown in the middle cross-section of step "a"). Finally, the delivery channels 122a and 122b can be etched into the silicon substrate 108 at the locations where the photoresist 142 has been removed (as shown in the right-hand cross-section of step "a"). This step can further include forming the outlet channels 128, the outlet collection channels 126, and the supply channels 124a and 124b in a similar manner using the photomask shown in FIG. 7. The delivery channels 122a and 122b, the outlet channels 128, the outlet collection channels 126, and the supply channels 124a and 124b can be formed together in the same masking and etching steps.

Figure 7:
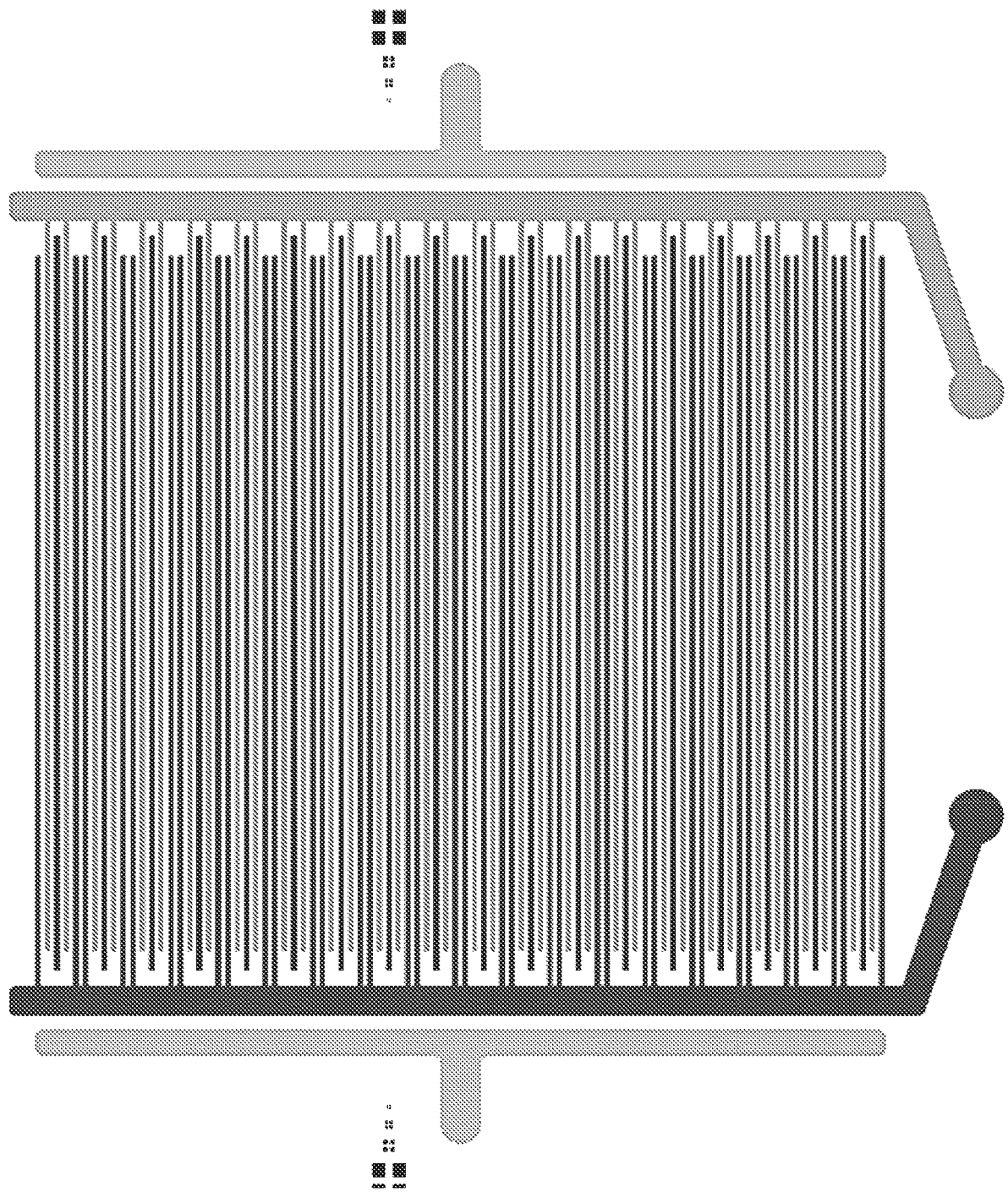
FIG. 7 shows a mask according to one embodiment that can be used in FIG. 6a to form the delivery channels.

In one specific example, the delivery channels were formed by coating the silicon substrate 108 with 12 μm of spray-coated photoresist 142, soft baking the substrate 108 on a hotplate at approximately 90° C. for 3 minutes, and exposing the photoresist 142 with the delivery channel photomask (FIG. 7). After exposure, the substrate 108 was left at room temperature for 12 hours for rehydration. The substrate 108 was then developed in MF 319 for 2 minutes and cleaned in SRD and then kept at 100° C. on a hotplate for 10 minutes. The substrate 108 was then cleaned again in a spin rinse dryer and etched in DRIE to achieve an etch depth of 370 The etched substrate 108 was subsequently cleaned in acetone, isopropyl alcohol (IPA) and deionized water for 5 minutes each and in nanostrip at 60 C for an hour and then cleaned in SRD.

Step "b" of FIG. 6 comprises forming the trenches 130 within the delivery channels 122a and 122b through the first surface 108a. For instance, the first surface 108a of the silicon substrate 108 and the surfaces of the delivery channels 122a and 122b can be coated with photoresist 142. A photomask, such as the photomask shown in FIG. 8, can be applied to the first surface 108a of the silicon substrate 108. The exposed portions of the photoresist 142 that are not covered by the photomask can be exposed to light, resulting in the photoresist 142 directly above the trenches 130 being weaker than the photoresist 142 that is not directly above the trenches 130. The photoresist 142 directly above the trenches 130 can then be removed (as shown in the middle cross-section of step "b"). Finally, the trenches 130 can be etched into the silicon substrate 108 at the locations where the photoresist 142 has been removed (as shown in the right-hand cross-section of step "b"). Implementing the trenches 142 in the delivery channels 122a and 122b can allow the tradeoff between the diameter of the vias and the mechanical stability of the wafer to be eliminated, thereby allowing the fabrication of small footprint devices to allow many replicate devices to be incorporated onto a single chip.

Figure 8:
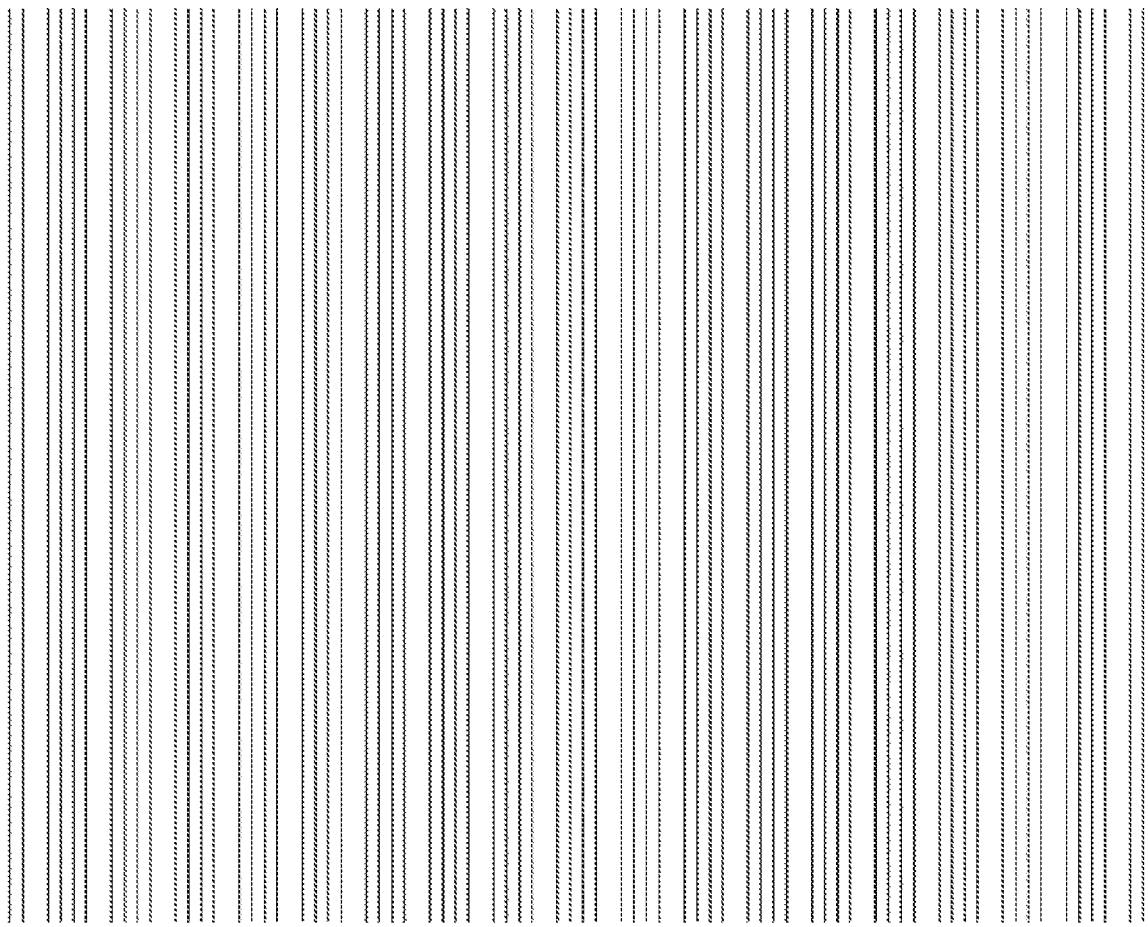
FIG. 8 shows a mask according to one embodiment that can be used in FIG. 6b to form the trenches.
Figure 9:
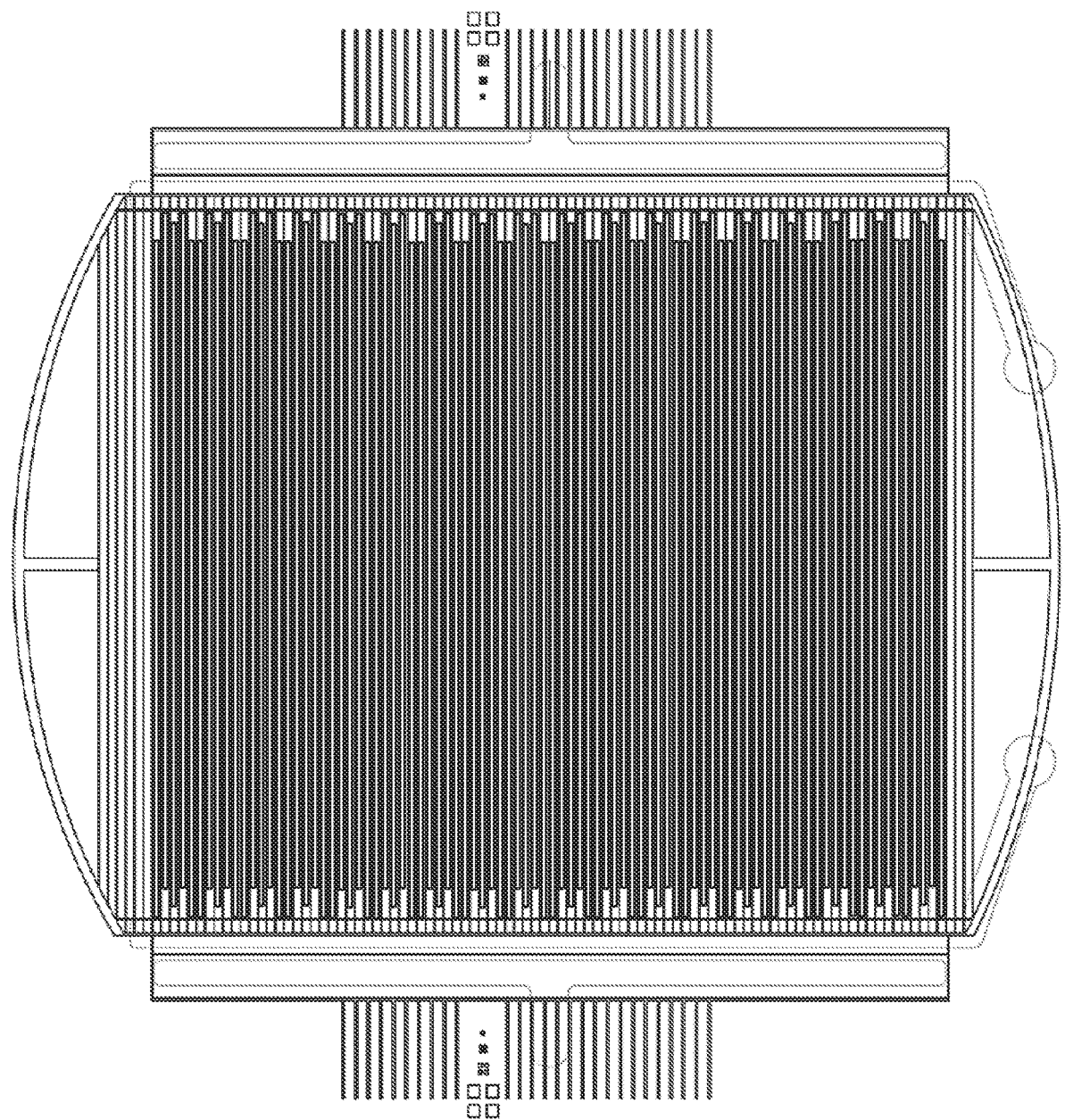
FIG. 9 shows a mask according to one embodiment that can be used in FIG. 6c to form the oxide layer.

In one specific example, the trenches were formed by coating the substrate 108 with 8 μm of spray coated photoresist, soft baking the substrate 108 at 90° C. for 2 minutes, and exposing the photoresist 142 with the trench channels photomask (FIG. 8). After exposure, the substrate 108 was left idle at room temperature for 1 hour for rehydration. The substrate 108 was then developed in MF 319 for 2 minutes and cleaned in SRD and then kept at 100 C for 5 minutes. The substrate 108 was cleaned again in SRD and etched in DRIE to a height of h=75 The substrate 108 was cleaned and kept in nanostrip for an hour. The etched substrate 108 was then cleaned in SRD.

Step "c" of FIG. 6 comprises forming a stress relieved oxide layer (Layer-3), such as a silicon dioxide ($SiO_2$) layer, as an etch-stop for the etching that occurs on the second surface 108b of the substrate 108. The stress relieved oxide layer can be used in place of conventional carrier wafers that would otherwise be applied to the first surface 108a of the substrate 108 during etching on the second surface 108b. Utilizing the oxide layer during etching of the second surface 108b can limit debris and wafer warping. Note that, in some embodiments, one of steps "b" and "c" can be omitted such that trenches 130 are not formed in the delivery channels or the oxide is not formed on the substrate 108b. However, preferably, both steps "b" and "c" are implemented.

To form the stress relieved oxide layer, an oxide layer 144, such as (without limitation) plasma enhanced chemical vapor deposition (PECVD) oxide, can be applied to the first surface 108a, the surfaces of the delivery channels 122a and 122b, and the surfaces of the trenches 130 as shown in the middle cross section of step "c". The first surface 108a of the silicon substrate 108 and the surfaces of the delivery channels 122a and 122b can then be coated with photoresist 142 over top of the oxide. A photomask, such as the photomask shown in FIG. 9, can be applied to the first surface 108a of the silicon substrate 108. The exposed portions of the photoresist 142 that are not covered by the photomask can be exposed to light, resulting in the photoresist 142 between the delivery channels 122a and 122b being weaker than the photoresist 142 that is not between the delivery channels 122a and 122b. The photoresist 142 between the delivery channels 122a and 122b can then be removed, and the stress relief pattern can be etched into the oxide layer 144 between the delivery channels 122a and 122b (as shown in the right-most cross-section of step "c").

In one specific example, the oxide layer 144 was formed by depositing 6 µm of plasma enhanced chemical vapor deposition (PECVD) oxide onto the substrate 108 at a rate of 0.3 µm per minute. After deposition of the oxide layer 144, the substrate 108 was cleaned in nanostrip for an hour. The substrate 108 was coated with 8 µm of spray coated photoresist, soft baked at 90° C. for 2 minutes, and exposed with the oxide pattern (Layer-3) photomask. After exposure, the substrate 108 was left idle at room temperature for 1 hour for rehydration. The substrate 108 was then developed in MF 319 for 2 minutes, cleaned in SRD, and then kept at 115 C for 8 minutes. The substrate 108 was cleaned again in SRD and etched in 25% HF for 1 minute to pattern oxide layers. The substrate 108 was then cleaned and kept in nanostrip for an hour and cleaned in SRD.

Step "d" of FIG. 6 comprises flipping the substrate 108 and forming underpass channels 133 (Layer-4) into the second surface 108b. The underpass channels 133 extend under the supply channels 124a and 124b so as to fluidly couple the outlet collection channels 126 to the at least one outlet channel 128. Note that this step can be omitted in some embodiments where the underpass channels are not needed or the underpass channels can be alternatively formed to fluidly connect channels other than the outlet collection channels 126 to the at least one outlet channel 128. To form the underpass channels, the second surface 108b of the silicon substrate 108 can be coated with photoresist 142. A photomask, such as the photomask shown in FIG. 10, can be applied to the second surface 108b of the silicon substrate 108. The exposed portions of the photoresist 142 that are not covered by the photomask can be exposed to light, resulting in the photoresist 142 directly above the underpass channels 133 being weaker than the photoresist 142 that is not directly above the underpass channels 133. The photoresist 142 directly above the underpass channels 133 can then be removed (as shown in the middle cross-section of step "d"). Finally, the underpass channels 133 can be etched into the silicon substrate 108 at the locations where the photoresist 142 has been removed (as shown in the right-hand cross-section of step "d").

In one specific example, the underpass channels 133 were formed by coating the substrate 108 with 4 µm of spray coated photoresist, soft baking the substrate 108 at 90 C for 2 minutes, and subsequently exposing to UV with the underpass channels (Layer-4) photomask of FIG. 10. After exposure, the substrate 108 was left idle at room temperature for 20 minutes for rehydration. The substrate 108 was then developed in MF 319 for 2 minutes, cleaned in SRD, and kept at 100 C for 3 minutes. The substrate 108 was subsequently cleaned again in spin rinse dryer and etched in DRIE for an etch depth of 30 The substrate 108 was cleaned in acetone, IPA, water and kept in nanostrip for an hour and cleaned again in SRD.

Step "e" of FIG. 6 comprises forming a plurality of through silicon vias 132a and 132b (Layer-5) into the second surface 108b such that the vias 132a and 132b are aligned with the delivery channels 122a and 122b along the transverse direction T. For instance, the second surface 108b of the silicon substrate 108 can be coated with photoresist 142. A photomask, such as the photomask shown in FIG. 11, can be applied to the second surface 108b of the silicon substrate 108. The exposed portions of the photoresist 142 that are not covered by the photomask can be exposed to light, resulting in the photoresist 142 directly above the vias 132a and 132b being weaker than the photoresist 142 that is not directly above the vias 132a and 132b. The photoresist 142 directly above the vias 132a and 132b can then be removed (as shown in the middle cross-section of step "e"). Finally, the vias 132a and 132b can be etched into the silicon substrate 108 at the locations where the photoresist 142 has been removed (as shown in the right-hand cross-section of step "e"). As shown, the vias 132a and 132b can be etched up to the oxide layer 144, without extending through the oxide layer 144.

In one specific example, the vias 132a and 132b were formed by spray coating the substrate 108 with 8 µm of photoresist, soft baking the substrate 108 at 90 C for 4 minutes, and exposing the vias 132a and 132b with the via photomask of FIG. 11. After exposure, the substrate 108 was left at room temperature for 1 hour for rehydration. The substrate 108 was then developed in MF 319 for 2 minutes, cleaned in SRD and kept at 100 C for 5 minutes. The substrate 108 was subsequently cleaned again in spin rinse dryer and etched in DRIE for through silicon vias. The microfabricated substrate 108 was is cleaned and kept in nanostrip for an hour.

Step "f" of FIG. 6 comprises forming a plurality of droplet generators 118 (Layer-6) in the second surface 108b of the substrate 108. The droplet generators 118 can be formed so as to be in fluid communication with the vias 132a and 132b. For instance, the second surface 108b of the silicon substrate 108 can be coated with photoresist 142. A photomask, such as the photomask shown in FIG. 12, can be applied to the second surface 108b of the silicon substrate 108. The exposed portions of the photoresist 142 that are not covered by the photomask can be exposed to light, resulting in the photoresist 142 directly above the droplet generators 118 being weaker than the photoresist 142 that is not directly above the droplet generators 118. The photoresist 142 directly above the droplet generators 118 can then be removed (as shown in the middle cross-section of step "f"). Finally, the droplet generators 118 can be etched into the silicon substrate 108 at the locations where the photoresist 142 has been removed (as shown in the right-hand cross-section of step "f"). As shown, the oxide layer 144 can remain in place during the etching of the droplet generators 118.

In one specific example, the droplet generators 118 are formed by coating the substrate 108 with a monolayer of hexamethyldisilane (HMDS) in a Yes Plus Oven to improve the adhesion of the photoresist to the etched silicon substrate 108. This step was performed for the droplet generator layer (Layer-6), because the spacing between channels was less than 8 μm and the resist can delaminate in the presence of developer or during SRD. Subsequently, 4 μm of photoresist was spray coated onto the substrate 108, the substrate 108 was soft baked in an oven at 130 C for 5 minutes, and the substrate 108 was exposed to UV using the droplet maker channel (Layer-6) photomask of FIG. 12. After exposure, the substrate 108 was left at room temperature for 10 minutes. The substrate 108 was then developed in MF 319 for 2 minutes, cleaned in SRD, and kept at 100 C for 5 minutes. The substrate 108 was cleaned in SRD again and etched in DRIE to a 24 μm depth to form the droplet generators 118.

Step "g" of FIG. 6 comprises removing the oxide layer 144 such that the vias 132a and 132b are in fluid communication with the delivery channels 122a and 122b. Step "g" can further comprise bonding glass wafers 110 and 112 to the first and second surfaces 108a and 108b, respectively.

In one specific example, the 3D etched substrate 108 was bonded to two 4" diameter borofloat 33 glass wafers 110 and 112 to encapsulate the microfluidic channels 122a and 122b. The 3D etched substrate 108 was cleaned in acetone, IPA and DI water for 5 minutes each and then in nanostrip for an hour. The 3D etched substrate 108 and a 4 inch borofloat 33 glass wafer 110 were kept in piranha solution for 1 hour, immersed in deionized water for 5 minutes, and cleaned in SRD. The cleaned substrate 108 and wafer 110 were bonded in an Anodic bonding tool by applying 100 N force and 800 Volts for an hour in an EVG 510 anodic bonding tool. A 4 inch borofloat 33 glass wafer 112 with excimer laser-drilled 1 mm holes that serve as inlets 114 and 116 and outlets 120 was cleaned in acetone, IPA, and DI water for 5 minutes each. The laser drilled glass wafer 112 and the substrate 108 were kept in piranha solution for 1 hour and then immersed in deionized water. To completely remove the piranha solution from the microchannels, a long immersion time in water was employed. The wafers 110 and 112 were bonded to the substrate 108 using an EVG bonding tool, applying 100 N force and 800 Volts for an hour. Both wafers 110 and 112 were cleaned thoroughly and handled carefully during the bonding process to avoid possible dust or debris, which could result in weak anodic bonding that could cause device leakage during operation of the microfluidic device.

The methods of forming TSVs using and oxide layer and trenches as described herein can similarly be applied to other applications that employ silicon chips such as for integrated circuits.

We present a new robust method to fabricate three dimensional microfluidic devices to improve the throughput of microfluidics by allowing parallel and simultaneous operation of many replicate devices on a single chip. Recently, massively parallelized microfluidic chips fabricated in Silicon and glass have been developed to increase the throughput of microfluidic materials synthesis to the industrial scale. These parallelized microfluidic chips require large arrays (>10,000) of Through Silicon Vias (TSVs) to deliver fluid from delivery channels to the parallelized devices. Ideally, these TSVs should have small footprint to enable a high density of features to be packed into a single chip, and at the same time debris generation and wafer warping must be minimized to enable permanent bonding of the device to glass. TSVs in parallelized devices also have complex channels on both sides. Because of these requirements and challenges, conventional approaches cannot be easily applied to produce three dimensional microfluidic chips with a large array of TSVs. In this paper, we report a set of strategies for the robust fabrication of three-dimensional Silicon microfluidic chips with TSVs specifically designed for highly parallelized microfluidics. We have developed a two-layer TSV design that allows small diameter vias without sacrificing the mechanical stability of the chip and a patterned $SiO_2$ etch-stop layer to replace the use of carrier wafers in Deep Reactive Ion Etching (DRIE). Our microfabrication strategy allows>50,000 (d=15 μm) TSVs to be fabricated on a single 4" wafer, using only conventional semiconductor fabrication equipment, with 100% yield (M=16 chips). We demonstrated the utility of these fabrication strategies by developing a chip that incorporates 20,160 flow focusing droplet generators onto a single 4" Silicon wafer. This chip represents a 100% increase in the total number of droplet generators on a single chip than has previously been reported. The chip was tested by creating highly monodispersed hexadecane droplets in water (CV<4%) at a throughput of 5.3 L/hr, or 1 trillion droplets per hour.

In many sub-fields of microfluidics, parallelization—the placing of many replicate devices that operate in parallel onto a single chip—has been a successful strategy to increase the throughput of otherwise slow processes.[1-16] Parallelization has been used with particular success to increase the production rate of microfluidic generated materials to the scale required for economic commercial use, including nanomaterials, microparticles, and a variety of single and multiple emulsions.[1-12] This approach has also been applied successfully to increase the throughput of micro-sensors to detect cells and molecular markers[14-17] and to perform digital droplet based assays.[18,19] To deliver fluid to and collect fluid from many parallel microdevices on a single chip, three-dimensional microfabrication strategies have been used to incorporate a layer of delivery channels and vias that connect these delivery channels to microfluidic devices in a layer below.[1,5,9,10] Three-dimensional fabrication strategies have been developed for both polymer (PDMS, Perfluoropolyether-Polyethylene Glycol, etc.)[5,11] and for Silicon[9,20,21] based devices. Although Silicon devices are significantly more expensive than polymer devices, they have several key advantages that motivate their use; in particular, the generation of micro- and nanomaterials. Importantly, Silicon devices can operate at high pressure $P_{max}$>1000 PSI and high temperature $T_{max}$>500° C., use solvents useful for material synthesis but that are incompatible with polymer devices, and can be fabricated with significantly less variance in device dimensions than soft-lithography based devices, resulting in more monodispersed materials.[6,20]

The microfabrication of Silicon to create highly parallelized microfluidic devices has several fabrication challenges, which must be addressed to produce high performing chips with high yield. Conventional TSV approaches cannot be easily applied to these architectures because of the small foot-print of these TSVs to allow many microfluidic devices to be packed onto a single wafer, because of the requirement of these chips for microfabricated features on both sides of the wafer, and because of the requirement for minimal debris and wafer warping such that the device can be permanently bonded to glass. We describe a set of microfabrication strategies specifically for parallelized microfluidics in Silicon and glass. (FIG. 13a) The two key innovations in this paper are: 1. We have developed a technique to through-etch the Si to produce vias that are compatible with the specific requirements of parallelized microfluidics, i.e. the requirement for DRIE features on both sides of the wafer and the requirement for minimal debris and wafer warping. To accomplish this goal, we replace the conventionally used carrier wafer with a stress relieved $SiO_2$ membrane as an etch-stop for DRIE. 2. We have implemented trenches in our delivery channel, which allow the tradeoff between the diameter of the vias and the mechanical stability of the wafer to be eliminated, allowing the fabrication of small footprint devices to allow many replicate devices to be incorporated onto a single chip.

To demonstrate the utility of these fabrication strategies, we have developed a Very Large Scale Droplet Integration (VLSDI) chip that incorporates 20,160 flow focusing droplet generators onto a single 4" Silicon wafer, representing a 100% increase in the total number of droplet generators on a single chip than has previously been reported (FIG. 13b) Using these generators that are connected in a ladder geometry with only one set of inlets and outlets, we generated 1 trillion droplets/hour with a CV<5% with diameters ranging from 21-28 μm. By incorporating the microfabrication strategies described in this paper, we achieved a device fabrication yield of 100% (M=16 wafers) using conventional semiconductor fabrication equipment. Our fabrication strategy can be widely used to enhance the reliability of microfabrication of three-dimensional Silicon and glass microfluidic chips for a variety of applications.

The VLSDI Chip

Figure 13:
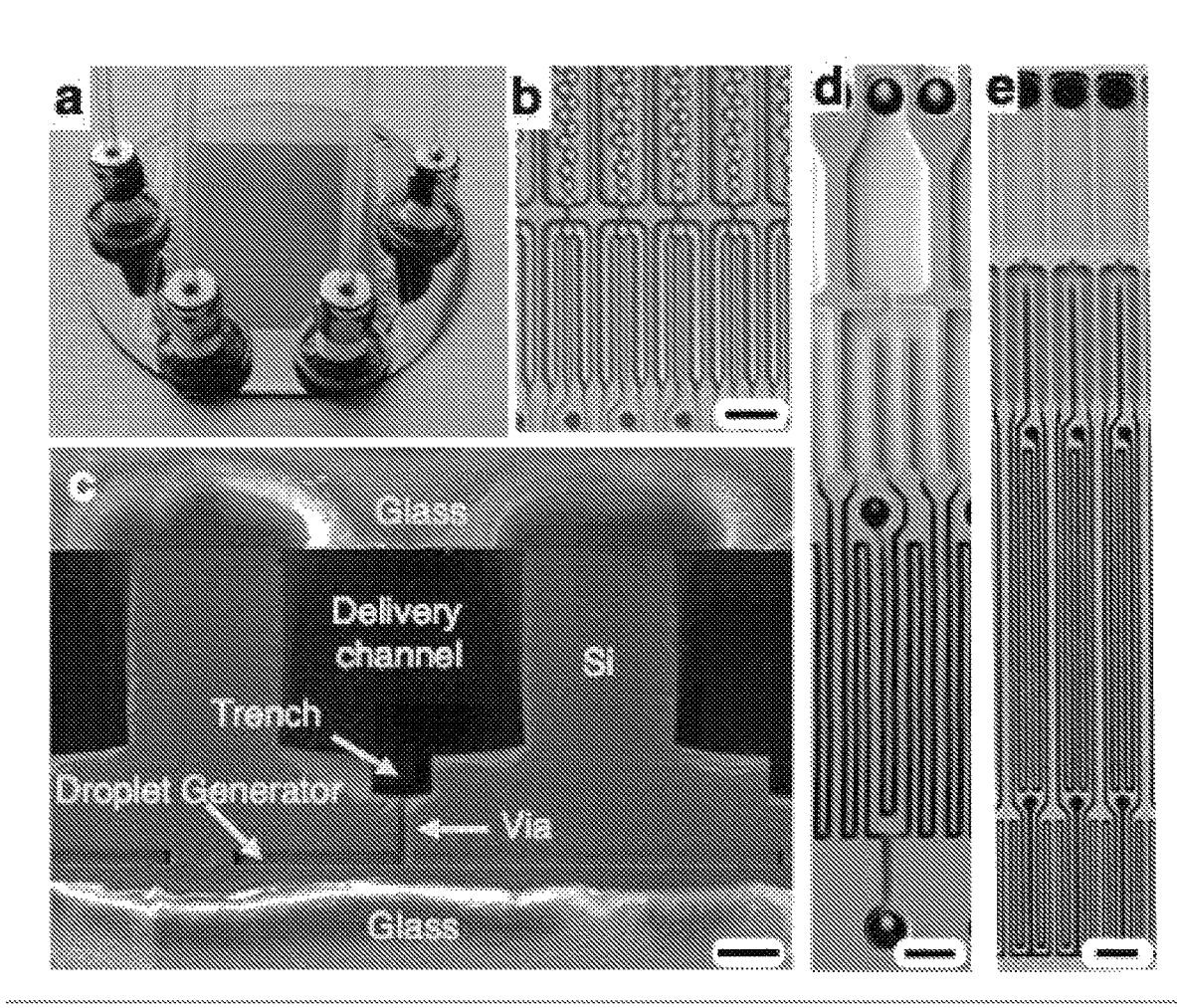
FIG. 13 a. A photograph of the 20 k-VLSDI chip (4" wafer), which consists of 20,160 (565×36) flow focusing generators (FFG's). b. An optical micrograph of individual droplet generators producing droplets. Scale bar 80 µm. c. An SEM micrograph of the cross section of the chip. Scale bar 115 µm d. The FFGs used in our previous 10-VLSDI chip. {Yadavali et al., 2018, #71560} Scale bar 80 µm. e. FFGs used in this work, where the device footprint has been scaled down by a factor of two compared to the prior work. Scale bar 80 µm.

Our 3D fabricated parallelized chips is built using a 4" diameter 500 μm thick double side polished Si wafer. (University Wafers, Part 1095) The chip consists of 370 μm height delivery channels on one side of the wafer, which includes a trench that has a depth of 75 μm. On the other side of the wafer, there are flow focusing droplet generators with a height h=24 μm. Connecting these two layers of microfluidics are vias with a diameter d=15 μm and a height h=85 μm. Both sides of the wafer are permanently bonded with Borofloat 33 glass (University wafers, Part 517) using anodic bonding to encapsulate the channels. (FIG. 13c) In this work, we have increased the total number of droplet generators that can be incorporated onto a single wafer by reducing the size of the vias, resulting in a footprint (80 μm×1.6 mm) for each droplet generator that is half that reported in our previous work. (FIG. 13d).

Microfabrication Challenges

The microfabrication of VLSDI chips in Silicon is made particularly challenging because of the Through Silicon Vias (TSVs) required to create the connections between the delivery channels and the droplet generators. Although there is a well developed literature on TSVs for MEMS applications and for CMOS chips, VLSDI chips have several unique requirements that warrant special consideration. Unlike many through-etching applications, parallelized microfluidic chips require microfabricated patterns on both sides of the chip, making many existing through-etching techniques not easy to implement, i.e. the use of mechanical polishing to expose TSVs. Moreover, parallelized microfluidic chips must be anodically bonded with glass to encapsulate the microfluidic devices, making the fabrication process sensitive to wafer warping and to contamination from debris. Finally, from a design perspective, in VLSDI chips it is advantageous to pack as many parallelized chips onto a wafer as possible. Therefore it is important that the vias have the smallest possible footprint. This requirement makes techniques such as anisotropic wet etching (e.g. potassium hydroxide KOH, tetramethylammonium hydroxide TMAH) unfavorable, due to their angled sidewalls. Finally, VLSDI chips often require high aspect ratio features (height/width~5), motivating the use of Deep Reactive Ion Etch (DRIE) for the etching of the microfluidic channels.

Step-by-Step Fabrication of Microfluidic Devices

Our device has six mask layers (FIG. SI 1-SI 6), including layers for delivery channels (Layer 1), trenches (Layer 2), oxide mechanical stress relief (Layer 3), under-pass channels (Layer 4), through silicon vias (Layer 5) and droplet generator channels (Layer 6). To fabricate these six layers, we produced six photomasks that are prepared on chrome-coated soda lime glass (AZ1500) using a Heidelberg 66 plus mask writer and a 10 mm write head. After exposure, all photoresists are developed in MF 319 developer for 1 minute and in chrome etchant for a minute and then the remaining photoresist is removed by immersion in 1165 developer at 60 C with sonication for 5 minutes.

To fabricate the VLSDI chip, the layers are lithographically patterned, developed, and the channels are etched using deep reactive ion etching (SPTS Rapier Si DRIE). For all layers, S1805 photoresist is mixed with acetone (1:8) and the resist is spray coated to its required thickness in Suss Microtech Spray coater. Spray coating is used rather than spincoating due to the deep high aspect ratio features on our chip, which would not be uniformly coated with spin coating. After each fabrication step, the wafers are cleaned using a Spin Rinse Dryer (SRD) (rinse with water at 500 rpm for 90 seconds and dry in nitrogen air at 3000 rpm for 90 seconds) after developing the photoresist and before DRIE.

Figure 14:
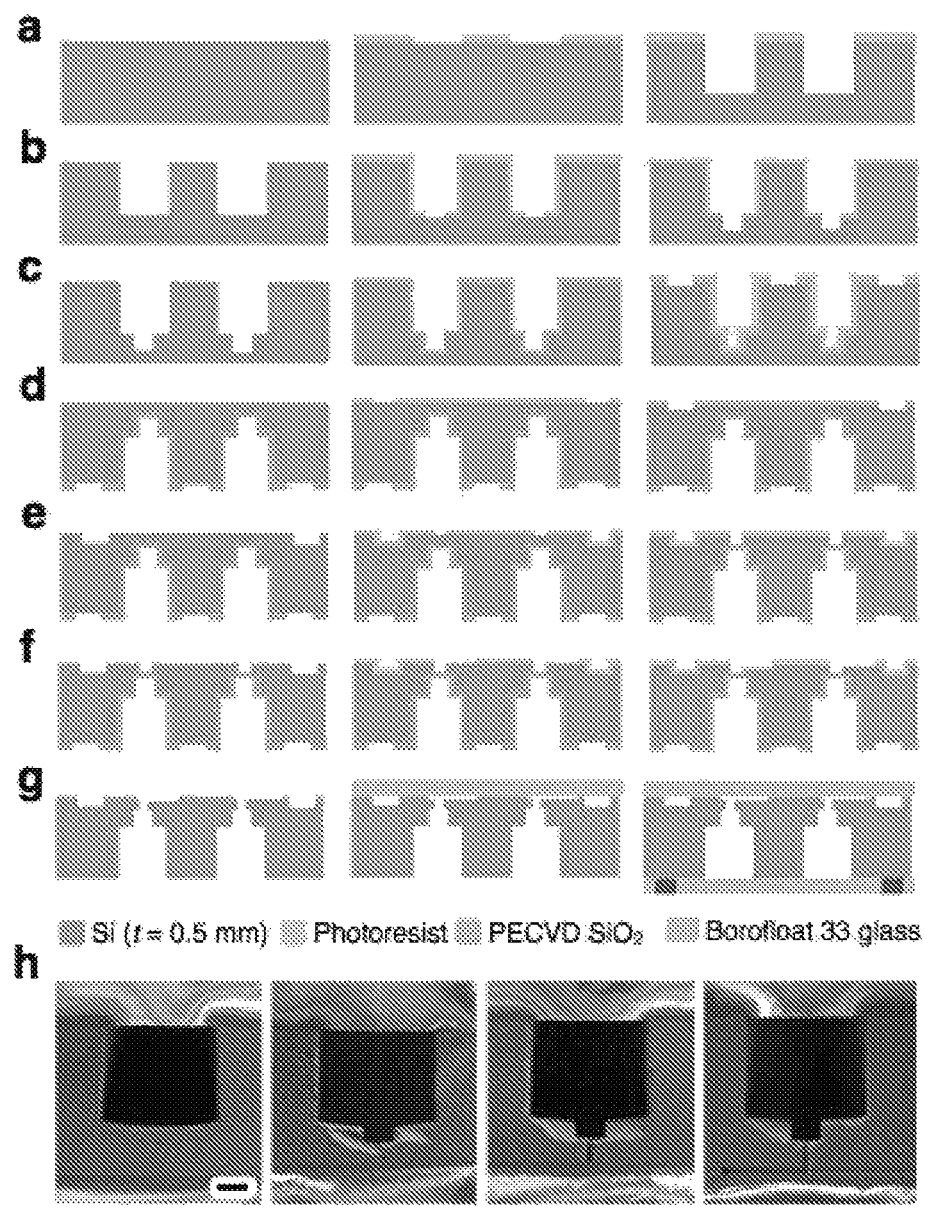
FIG. 14—Schematic step by step description and 3D fabrication of 20 k-VLSDI chip in a single 4" Silicon wafer. a. Fabrication of delivery channels. b. Fabrication of trenches inside delivery channels. c. Fabrication of $SiO_2$ etch-stop layer. d. Fabrication of underpass channels in backside of wafer. e. Fabrication of Through Silicon Vias (TSVs). f. Fabrication of flow focusing generators. g. The 3D etched wafer and 4" borofloat 33 glass wafers are anodically bonded to encapsulate the microfluidic channels. h. Scanning electron micrograph image shows the sequential etch process of fabrication in 20 k-VLSDI chip. Scale bar 115 µm, for ease of comparison the images are not flipped.

The fabrication steps are carried out as described below, and are shown schematically in FIG. 14a-g and as electron micrographs in FIG. 14h. For the first layer (FIG. 14a), we first coat the wafer with 12 μm of spray-coated photoresist, soft baked on a hotplate at 90° C. for 3 minutes, and expose with the delivery channels (Layer-1) photomask. After exposure, the wafer is left at room temperature for 12 hours for rehydration. The wafer is then developed in MF 319 for 2 minutes and cleaned in SRD and then kept at 100° C. on a hotplate for 10 minutes. The wafer is then cleaned again in a spin rinse dryer and etched in DRIE to achieve an etch depth of 370 μm. The etched wafer is subsequently cleaned in acetone, isopropyl alcohol (IPA) and deionized water for 5 minutes each and in nanostrip at 60 C for an hour and then cleaned in SRD.

For the second layer (FIG. 14b), we first coat the wafer with 8 μm of spray coated photoresist, soft baked at 90° C. for 2 minutes, and exposed with the trench channels (Layer-2) photomask. After exposure, the wafer is left idle at room temperature for 1 hour for rehydration. The wafer is then developed in MF 319 for 2 minutes and cleaned in SRD and then kept at 100 C for 5 minutes. The wafer is cleaned again in SRD and etched in DRIE to a height of h=75 μm. The wafer is cleaned and kept in nanostrip for an hour. The etched wafer is then cleaned in SRD.

For the third layer (FIG. 14c), we first deposit 6 μm of PECVD oxide layer at a rate of 0.3 μm per minute. After deposition of oxide layer, the wafer is cleaned in nanostrip for an hour. The wafer is coated with 8 μm of spray coated photoresist, soft baked at 90° C. for 2 minutes, and exposed with the oxide pattern (Layer-3) photomask. After exposure, the wafer is left idle at room temperature for 1 hour for rehydration. The wafer is then developed in MF 319 for 2 minutes, cleaned in SRD, and then kept at 115 C for 8 minutes. The wafer is cleaned again in SRD and etched in 25% HF for 1 minute to pattern oxide layers. The wafer is then cleaned and kept in nanostrip for an hour and cleaned in SRD.

For the fourth layer (FIG. 15d), the wafer is flipped. We coat the wafer with 4 µm of spray coated photoresist which is soft baked at 90 C for 2 minutes and subsequently exposed to UV with the underpass channels (Layer 4) photomask. After exposure, the wafer is left idle at room temperature for 20 minutes for rehydration. The wafer is then developed in MF 319 for 2 minutes, cleaned in SRD and kept at 100 C for 3 minutes. The wafer is subsequently cleaned again in spin rinse dryer and etched in DRIE for an etch depth of 30 µm. The wafer is cleaned in acetone, IPA, water and kept in nanostrip for an hour and cleaned again in SRD.

For the fifth layer (FIG. 15e), we spray coat the wafer with 8 µm of photoresist, soft bake at 90 C for 4 minutes, and exposed with the vias (Layer 5) photomask. After exposure, the wafer is left at room temperature for 1 hour for rehydration. The wafer is then developed in MF 319 for 2 minutes, cleaned in SRD and kept at 100 C for 5 minutes. The wafer is subsequently cleaned again in spin rinse dryer and etched in DRIE for through silicon vias. The microfabricated wafer is cleaned and kept in nanostrip for an hour.

For the sixth layer (FIG. 15f), the wafer is coated with a monolayer of hexamethyldisilane (HMDS) in Yes Plus Oven to improve the adhesion of photoresist to the etched silicon wafer. This step is necessary for the droplet generator layer (Layer 6), since the spacing between channels is less than 8 µm and the resist can delaminate in the presence of developer or during SRD. Subsequently, 4 µm of photoresist is spray coated, soft baked in an oven at 130 C for 5 minutes, and exposed to UV with the droplet maker channel (Layer 6) photomask. After exposure, the wafer is left at room temperature for 10 minutes. The wafer is then developed in MF 319 for 2 minutes and cleaned in SRD and kept at 100 C for 5 minutes. The wafer is cleaned in SRD again and etched in DRIE to a 24 µm depth to form the droplet generators.

Finally, the 3D etched wafer is permanently bonded to two 4" diameter borofloat 33 glass wafers to encapsulate the microfluidic channels. (FIG. 15g) The 3D etched wafer is cleaned in acetone, IPA and DI water for 5 minutes each and then in nanostrip for an hour. The 3D etched wafer and a 4 inch borofloat 33 glass wafer are kept in piranha solution for 1 hour and immersed in deionized water for 5 minutes, and cleaned in SRD. The cleaned wafers are bonded in Anodic bonding tool by applying 100 N force and 800 Volts for an hour in an EVG 510 anodic bonding tool. Another 4 inch borofloat 33 glass wafer with excimer laser-drilled 1 mm holes that serve as inlets and outlets is cleaned in acetone, IPA, and DI water for 5 minutes each. The laser drilled glass wafer and the VLSDI chip are kept in piranha solution for 1 hour and then immersed in deionized water. To completely remove the piranha solution from the microchannels, a long immersion time in water is recommended. The wafers are bonded using an EVG bonding tool, applying 100 N force and 800 Volts for an hour. Both wafers are cleaned thoroughly and handled carefully in the entire process during bonding procedure to avoid possible dust or debri that may result in weak anodic bonding (FIG. SI 10) that may finally result in device leakage during operation (FIG. SI 11).

To connect the VLSDI chip to the outside world, we subsequently connect the chip to a custom-built pressure-driven flow manifold. Stainless steel compressed tube fittings (⅛" tube OD) from McMaster Carr (52245K609) are bonded to the glass wafer using chemically resistant epoxy from Master Bond (EP41S-5). The epoxy is allowed to cure at room temperature for 4 days. ⅛" OD PTFE tubes were connected to the fittings. Pressure driven flow is used to conduct the experiments. Nitrogen pressure tanks were connected to 1 gallon and 3 gallon stainless steel pressure vessels (Alloy products). The 1-gallon vessel is used for dispersed phase and the 3 gallon vessel is used for continuous phase. The VLSDI chip is connected to the pressure vessels using PTFE tubings. The VLSDI chip is housed in a custom-built acrylic box and mounted onto an xyz translational stage. Inline filters (McMaster Carr: 9816K72) are used to filter debris for both the continuous and dispersed phases. An inline flow meter (McMaster Carr: 5084K23) is used to measure the flow rate of water phase. The detailed experimental setup for VLSDI chip is shown in FIG. SI 9.

Results

Etching of Through Silicon Vias (TSVs)

Figure 15:
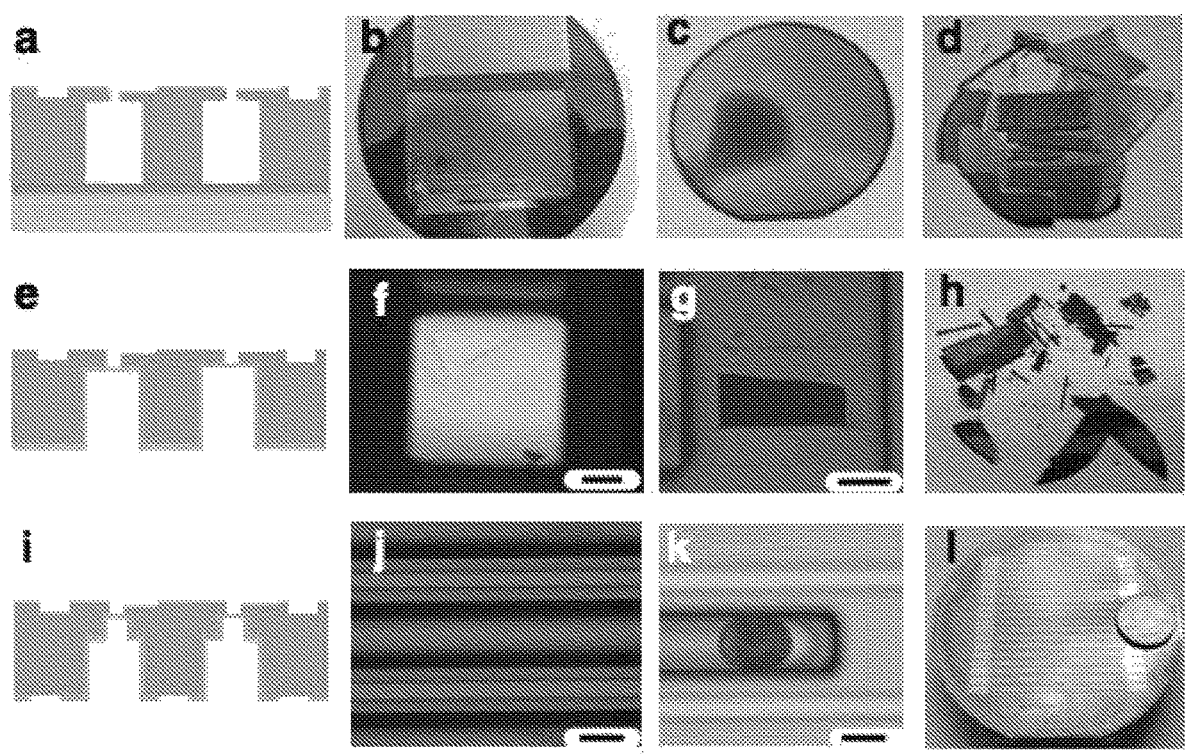
FIG. 15—Fabrication strategies to tackle the challenges of the VLSDI chip. a. Schematic showing conventional TSV etching using a carrier wafer. b. A photograph shows broken wafer in DRIE chamber that is bonded to carrier wafer using crystal bond adhesive, due to trapped air pockets between the wafers. c. A photograph shows non uniform etching of TSVs due to nonuniform temperature across the wafer when using a carrier wafer. d. A photograph shows a wafer that broke while being removed from the carrier wafer. The yield using a carrier wafer was 30%. e. Schematic showing our technique to replace the carrier wafer with a PECVD SiO2 etch-stop, but where we do not include stress relief for the oxide or trenches in the delivery channel. f Micrograph shows broken oxide layer at underpass via positions, due to stress relief features not being included. Scale bar 100 µm g. Micrograph shows broken wafer at the intersection of underpass and supply channel positions due to deep etching of delivery channels (~460 µm), due to trenches not being included. Scale bar 500 µm h. Photograph shows a 3D etched wafer broken during drying with a Nitrogen gun, due to trenches not being included. The yield using this technique was 50%. i. Schematic image showing our final robust fabrication strategy, including both the SiO2 etch-stop, stress relief, and trenches in the delivery channel. j,k Images show the stress relieved oxide layer and a successful via etch. Scale bars 200 µm (l) Photograph shows successfully fabricated and bonded 20 k-VLSDI chip. The yield using this technique is 100% (M=16 chips).

Through-etching using DRIE is challenging because in a typical DRIE Bosch process the backside of the wafer is kept at a positive pressure, to keep the wafer at a low temperature using He gas, and the frontside is maintained under a vacuum necessary for reactive ion etching. The wafer is held in position using an electrostatic chuck (FIG. SI 7). Once the first TSV punches through the Silicon, the vacuum is broken and the etching process halts. This problem is particularly pertinent for our design, because of the variety of the diameter of TSVs used. Larger diameter TSVs etch faster, and therefore break through the Silicon before the smaller ones (FIG. SI 8). The etch quality, uniformity across the wafer, and photoresist selectivity depends on the wafer temperature, and as such the He cooling is necessary. To address this issue, often TSVs are etched only through 40 to 60% of the wafer thickness and then finished by chemical mechanical polishing of the wafers from the backside. Because our VLSDI chips require DRIE etched patterns on both the front and back side of the wafer, such an approach is not applicable. Another conventional approach to TSV etching is to bond the wafer to a carrier wafer using a temporary adhesive like crystal bond (FIG. 15a). However, it can be challenging to remove all air pockets between the two wafers, which leads to wafer breakage in the DRIE's vacuum (FIG. 15b). In addition, even if wafers do not break, the presence of small air pockets between the carrier wafer and the VLSDI can lead to nonuniform etching on the wafer. (FIG. 15c). The yield of our VLSDI chip using a carrier wafer was only 30%. (FIG. 15d)

To overcome this challenge, we instead used a Chemical Vapor Deposition (CVD) grown oxide layer as an etch stop. (FIG. 15e) A 6 µm thick layer of CVD grown $SiO_2$ is deposited on to the delivery channels side of the wafer before the vias are etched. The use of an $SiO_2$ back-layer obviates the need for the temporary adhesives and associated problems with uniformity of temperature across the wafer during processing. To avoid mechanical stress on the wafer from the 6 µm thick $SiO_2$ layer, which can lead to wrinkling of the $SiO_2$ membrane and breaking of the Si wafer (FIG. 15f), the $SiO_2$ layer is lithographically patterned to relieve the mechanical stress (FIG. 15i). This approach results in mechanically stable membranes that act as effective etch stops and maintain the seal between the He cooling and the DRIE's vacuum, leading to uniform and reproducible TSV etching over the entire 4" wafer (FIG. 15j-1).

In this work we incorporated a two-layer design strategy to allow small diameter vias (d=15 µm) to be etched without sacrificing the mechanical stability of the VLSDI chip. (FIG. 15i). In a DRIE Bosch process, TSVs can be etched with aspect ratios as high as width:height=1:10. To ensure uniform etching across the wafer, and to ensure a high yield, we use a more conservative value 1:5. Therefore, to achieve a d=15 μm TSV, the etch depth must be h<75 μm. However, we found that if we etched the delivery channels to within 75 μm of the backside of the wafer, the chips became mechanically unstable and would often break during sample handling. (FIG. 15g,h). To overcome this challenge, we instead etched the via in two steps. First, we etched a trench in the delivery channel with a height h=75 μm and a width w=110 μm. (FIG. 14b,h) Subsequently, the vias are etched within the trench with a height h=85 μm and diameter d=15 μm to connect to the backside layer. By using our trench technique to achieve small vias and a stress relieved oxide backing layer, we have achieved a yield of 100% (N=20,160 devices per chip, M=16 chips).

VLSDI Design for High Throughput and Low Droplet Polydispersity

The design principals and ladder geometry of our VLSDI chip have been described in detail previously. Briefly, the main microfluidic design goals of our ultra-large-scale parallelization device is, (1) to evenly distribute both dispersed and continuous phase fluids to each of densely packed N microfluidic droplet generators, (2) to maximize the number of microfluidic droplet generators N that can be packed per unit area, and (3) to maximize the generation of uniform droplets from each of these N droplet generators at the highest possible flow rate. These design goals and the physics of multiphase flows provide trade off relationships that guide our ultra large scale parallelization design strategies. By satisfying these design considerations, we have designed a chip that consists of 20,160 microfluidic droplet generators arranged in a 36×560 rectangular array with a total foot print of 6.28×4.93 cm², with each generator having a footprint of 80 μm×1.6 mm.

Figure 16:
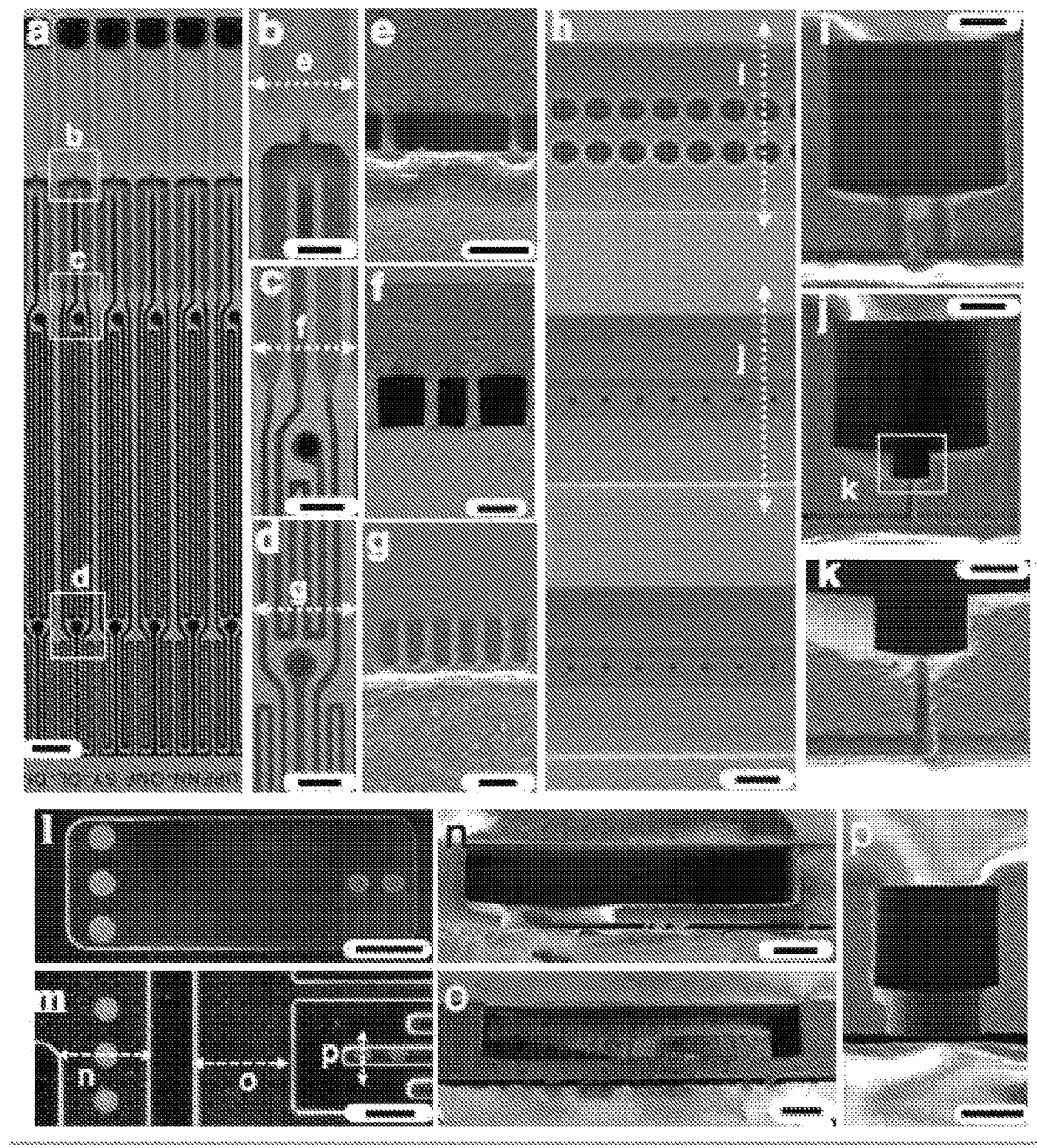
FIG. 16—Scanning electron microscope images of the 20 k-VLSDI chip. a. Top view of the chip. Scale bar 80 µm. Images b, c and d shows magnified views of a. Scale bars 40 µm, 40 µm, 33 µm, respectively. e, f, g show cross-sections of FFG's at positions marked in b, c and d. Scale bars 40 µm, 20 µm, 33 µm, respectively. h. Back view of the FFGs. Scale bar 107 µm. j show the cross-sections of delivery channels at locations marked in h. Scale bars 107 µm and 107 µm, respectively. k. Magnified view of the trench, via and ffg cross-sections. Scale bar 55 µm. l, m show optical micrographs of top view and bottom view at underpass locations in 20 k-VLSDI chip, respectively. Scale bars 1.45 mm and 1.1 mm, respectively. n, o, p. Micrographs show cross-section SEM micrographs at positions marked in image m. Th Scale bars 250 µm, 250 µm and 215 µm.
Figure 17:
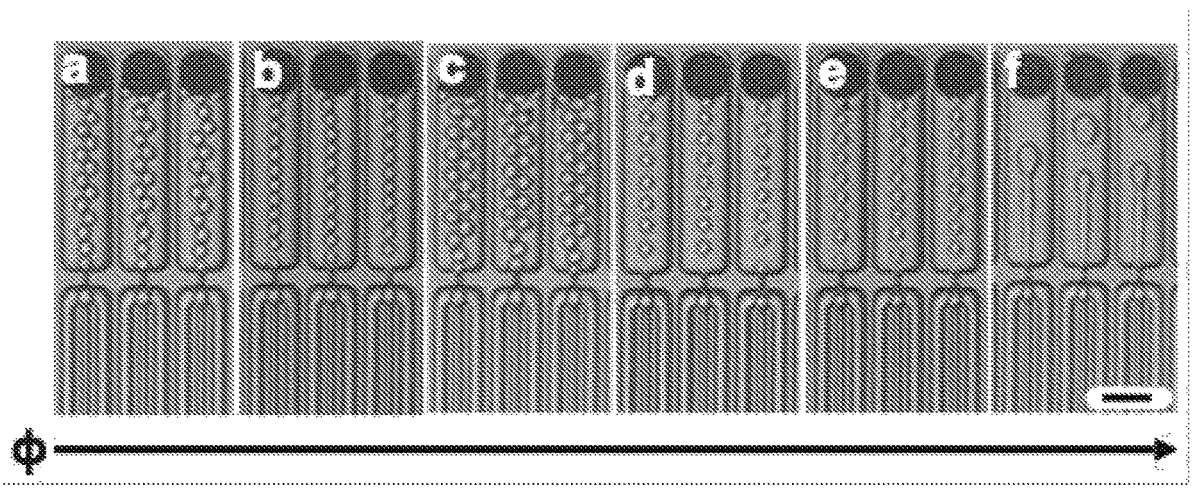
FIG. 17—High Throughput Microdroplet Generation. a-f. Optical micrographs show the dripping to jetting transition in our 20 k VLSDI chip for the production of hexadecane in water droplets. The maximum flow rate achieved in this device in the dripping regime was $\phi c=16.5$ L/hr (115 PSI) and $\phi d=5.1$ L/hr (90 PSI). The flow rates tested were (a) Qc=1.9 L/hr and Qd=0.9 L/hr, (b) Qc=4.5 L/hr and Qd=1.5 L/hr, (c) Qc=1.2 L/hr and Qd=1.1 L/hr, (d) Qc=10.2 L/hr and Qd=2.3 L/hr, (e) Qc=16.5 L/hr and Qd=5.1 L/hr and (f) Qc=16.5 L/hr and Qd=6 L/hr Scale bar: 80 µm.

The flow focusing droplet generators consist of a high aspect ratio flow resistor to ensure even distribution of flow across all 20,160 devices and a flow focusing droplet generator designed to remain in the dripping regime, by reducing the capillary number (Ca) of the continuous phase and the Weber (We) of the dispersed phase at high volumetric flow rates. (FIG. 16a-c). The dimensions of the droplet generators are shown in FIG. 16 a-g. The width of the flow resistors w=8 μm are less than the height, and thus allow the resistance to have a cubic dependence on the flow resistor's width $R \propto 1/(hw^3)$, and not the height of the entire droplet generator layer, decoupling each individual device's flow resistance from its maximum flow rate so that droplet break-up remains in the dripping regime. The delivery channels have dimensions w=0.43 mm, h=0.37 mm, l=54 mm (FIG. 16h-j). The supply channels, which supply fluid to the delivery channels, have dimensions w=2.2 mm, h=0.38 mm, l=66 mm (FIG. 16l-o). The trenches in the delivery channel have a w=110 μm and h=75 μm and the vias d=15 μm and h=85 μm. (FIG. 16 j-k). The underpasses, which allow the output to cross the supply lines, have the dimensions w=3 mm, l=7.8 mm, and h=30 μm (FIG. 16l and FIG. 16o).

Droplet Generation

We first evaluated these devices by generating hexadecane droplets in water (2 wt % Tween 80). We confirmed that at all flow rates droplets are generated in every one of the 20,160 droplet generators (Supplementary Movie S1, S3 and S3). We found that our device transitioned from making uniform droplets to polydisperse droplets at a critical flow rate $\phi_{dmax}$=5.3 L/hr, resulting in a maximum throughput of 1 trillion droplets/hour (FIG. 17a-f). When the device was in the dripping regime, the droplets were highly monodispersed (CV<5%) and at flow rates where the droplet generator were in the jetting regime, the droplets became highly polydisperse (CV»5%)

Figure 18:
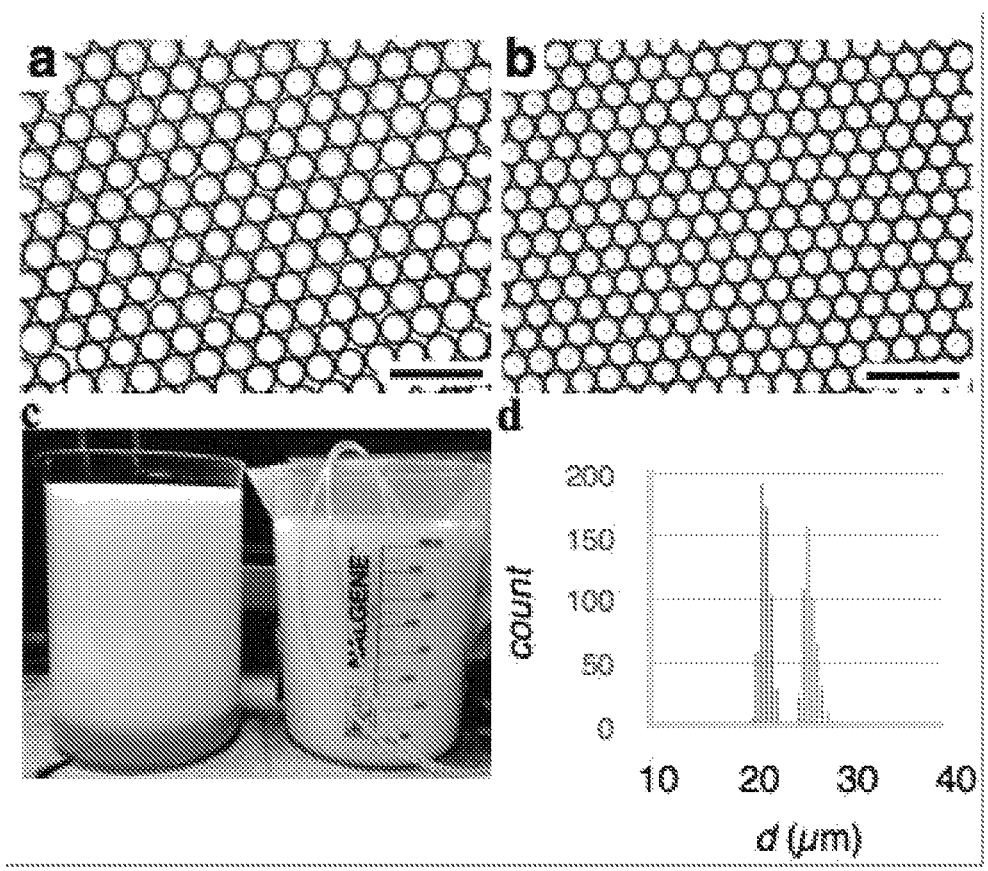
FIG. 18—Monodisperse droplets at high throughput. a. Optical micrographs of d=27 µm hexadecane droplets in oil produced by the 20 k VLSDI chip at Qc=1.2 L/hr and Qd=1.1 L/hr. b. Optical micrographs of d=21 µm hexadecane droplets in oil produced by the 20 k VLSDI chip at Qc=16.5 L/hr and Qc=5.1 L/hr. c. 8 L of emulsion collected by running our chip for 20 minutes with water at 16.5 L/hr and Oil at 5.1 L/hr. d. histogram of droplets in image (b). For both emulsions, CV<5%.

We further tested the mass production of oil-in-water emulsion by using pressure-driven flow. By changing the dispersed phase flow rate over the range of $\phi_d$=1 L/hr (20 PSI) to 5.3 L/hr (90 PSI) and the continuous aqueous phase over the range of $\phi_c$=1.9 L/hr (22 PSI) to 16.2 L/hr (115 PSI), the average droplet size could be controlled over a range of d=21-28 μm (FIG. 18a,b). The droplets were highly monodisperse at all flow rates, with a coefficient of variation CV<5% (FIG. 18c-d).

Discussion

In summary, we have developed strategies for the robust microfabrication of three-dimensional microchannels in Silicon to create highly parallelized microfluidic devices. We demonstrated the utility of these fabrication strategies by developing a VLSDI chip that incorporates 20,160 flow focusing droplet generators onto a single 4" Silicon wafer. Our microfabrication strategy allows >50,000 TSVs to be incorporated on a single 4" wafer, with diameters as small as 15 μm, with a 100% yield. Although we focus on the production of oil in water emulsions in this work, the VLSDI's modular design enabled by the incorporation of flow resistors that decouple the design requirements for parallelization and the design of each individual microfluidic device will allow for more complex designs to be parallelized for fabrication of solid polymer microparticles, multiple emulsions, micro-fibers, and nanomaterials.

Etching of TSVs in silicon has received much attention outside of microfluidics for its applications in three dimensional die stacking, memory stacking, CMOS, and Lab/System on a chip application. Etching of TSVs in silicon has be done using either laser machining, wet etching, or DRIE. Laser machining is a serial process and therefore not practical with wafer-scale processes that require >50,000 vias. Wet etching of silicon using KOH or TMAH is limited because isotropic etches lead to larger footprint devices, because the via diameter and the via depth are coupled. DRIE, which is a parallel process, has become an industry standard to etch vias in Silicon wafers with sharp sidewalls. The strategies detailed in this manuscript can potentially be used in CMOS and MEMS fields, beyond its microfluidics applications.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

What is claimed:

1. A microfluidic device, comprising:
at least one substrate having a first surface and a second surface, the first surface spaced from the second surface along a transverse direction, the at least one substrate comprising:
   at least one first inlet configured to receive a continuous phase fluid;
   at least one second inlet configured to receive a dispersed phase fluid;
   a plurality of droplet generators configured to produce micro-droplets from the continuous phase fluid and the dispersed phase fluid;
   a plurality of delivery channels in fluid communication with the at least one first inlet and with the at least one second inlet, wherein the plurality of delivery channels are offset from the plurality of droplet generators with respect to the transverse direction, each delivery channel of the plurality of delivery channels having a first cross-sectional dimension along a first plane perpendicular to the transverse direction;
   a plurality of trenches extending from the plurality of delivery channels towards the plurality of droplet generators along the transverse direction, each trench of the plurality of trenches having a second cross-sectional dimension along a second plane perpendicular to the transverse direction, wherein the second cross-sectional dimension is smaller than the first cross-sectional dimension;
   a plurality of vias extending from the plurality of trenches to the plurality of droplet generators along the transverse direction so as to fluidly connect the plurality of delivery channels and the plurality of the droplet generators; and
   at least one outlet configured to output the micro-droplets from the at least one outlet.

2. The microfluidic device of claim 1, wherein each delivery channel of the plurality of delivery channels and each trench of the plurality of trenches is elongate along a longitudinal direction perpendicular to the transverse direction.

3. The microfluidic device of claim 2, wherein the first sectional dimension and second cross-sectional dimension are along a lateral direction perpendicular to the transverse direction and perpendicular to the longitudinal direction.

4. The microfluidic device of claim 2, wherein the plurality of vias includes sets of vias, each set of the sets of vias extending from a respective trench of the plurality of trenches to a respective set of the plurality of droplet generators, wherein vias in a first set of vias are offset from vias in a second set of vias, along the longitudinal direction.

5. The microfluidic device of claim 1, wherein each via of the plurality of vias has a third cross-sectional dimension in a third plane that is perpendicular to the transverse direction, and wherein the third cross-sectional dimension is smaller than the second cross-sectional dimension.

6. The microfluidic device of claim 5, wherein each delivery channel of the plurality of delivery channels and each trench of the plurality of trenches is elongate along a longitudinal direction perpendicular to the transverse direction, and the first cross-sectional dimension, the second cross-sectional dimension, and the third cross-sectional dimension are along a lateral direction perpendicular to the transverse direction and perpendicular to the longitudinal direction.

7. The microfluidic device of claim 1, wherein the plurality of delivery channels includes a first delivery channel configured to transport the continuous phase fluid through the first delivery channel and a second delivery channel configured to transport the dispersed phase fluid through the second delivery channel.

8. The microfluidic device of claim 7, wherein the plurality of vias comprises a first set of vias and a second set of vias, wherein the first set of vias fluidly connects the first delivery channel to a set of the plurality of droplet generators, and the second set of the vias fluidly connects the second delivery channel to the set of the plurality of droplet generators.

9. The microfluidic device of claim 7, further comprising an outlet collection channel and a set of outlet vias, wherein the set of outlet vias fluidly connect the outlet collection channel to a set of the plurality of droplet generators.

* * * * *

UNITED STATES PATENT AND TRADEMARK OFFICE
CERTIFICATE OF CORRECTION

| | |
|---|---|
| PATENT NO. | : 12,194,460 B2 |
| APPLICATION NO. | : 17/425088 |
| DATED | : January 14, 2025 |
| INVENTOR(S) | : Sagar Prasad Yadavali et al. |

It is certified that error appears in the above-identified patent and that said Letters Patent is herewith corrected as shown below:

On the Title Page

Item (56) In Other Publications,

Under Column no. 2, Page 2, Line no. 44, Replace, "Ieee-Embs" with --IEEE-Embs--

In the Specification

Under Column no. 2, Line no. 36, Replace, "20 k-VLSDI" with --20k-VLSDI--

Under Column no. 2, Line no. 41, Replace, "μm" with --μm.--

Under Column no. 2, Line no. 47, Replace, "20 k-VLSDI" with --20k-VLSDI--

Under Column no. 2, Line no. 56, Replace, "20 k-VLSDI" with --20k-VLSDI--

Under Column no. 3, Line no. 3, Replace, "f" with --f.--

Under Column no. 3, Line no. 18, Replace, "20 k-VLSDI" with --20k-VLSDI--

Under Column no. 3, Line nos. 20-21, Replace, "20 k-VLSDI" with --20k-VLSDI--

Under Column no. 3, Line no. 26, Replace, "j" with --i, j--

Under Column no. 3, Line no. 31, Replace, "20 k-VLSDI" with --20k-VLSDI--

Under Column no. 3, Line no. 37, Replace, "20 k VLSDI" with --20k-VLSDI--

Under Column no. 3, Line no. 47, Replace, "20 k VLSDI" with --20k-VLSDI--

Signed and Sealed this
First Day of April, 2025

Coke Morgan Stewart
*Acting Director of the United States Patent and Trademark Office*

Under Column no. 3, Line no. 49, Replace, "20 k VLSDI" with --20k-VLSDI--

Under Column no. 8, Line no. 30, Replace, "370" with --370 µm.--

Under Column no. 8, Line no. 65, Replace, "h=75" with --h=75 µm.--

Under Column no. 10, Line no. 18, Replace, "30" with --30 µm.--

Under Column no. 12, Line no. 18, Replace, "allows>50,000" with --allows >50,000--

In the Claims

Under Column no. 20, Claim 5, Line no. 20, Replace, "plane that is" with --plane--